United States Patent
Aston et al.

(10) Patent No.: US 9,767,120 B2
(45) Date of Patent: Sep. 19, 2017

(54) MULTI-WAY CHECKPOINTS IN A DATA STORAGE SYSTEM

(75) Inventors: Christopher J. Aston, Bucks (GB); Simon L. Benham, Berkshire (GB); Neil Berrington, San Jose, CA (US)

(73) Assignee: HITACHI DATA SYSTEMS ENGINEERING UK LIMITED, Berkshire (GB)

(*) Notice: Subject to any disclaimer, the term of this patent is extended or adjusted under 35 U.S.C. 154(b) by 1225 days.

(21) Appl. No.: 12/164,730

(22) Filed: Jun. 30, 2008

(65) Prior Publication Data

US 2009/0182785 A1   Jul. 16, 2009

Related U.S. Application Data

(63) Continuation-in-part of application No. 12/015,192, filed on Jan. 16, 2008, now Pat. No. 8,504,904.

(51) Int. Cl.
*G06F 11/14* (2006.01)
*G06F 17/30* (2006.01)

(52) U.S. Cl.
CPC ...... *G06F 17/3023* (2013.01); *G06F 11/1448* (2013.01)

(58) Field of Classification Search
CPC ......... G06F 17/30067; G06F 17/30091; G06F 11/1448
USPC ........................................................ 707/828
See application file for complete search history.

(56) References Cited

U.S. PATENT DOCUMENTS

| 5,390,197 A | 2/1995 | MacDonald et al. |
| 5,402,430 A | 3/1995 | Asai et al. |
| 5,566,193 A | 10/1996 | Cloonan |
| 5,634,096 A * | 5/1997 | Baylor et al. ............... 714/6 |
| 5,819,292 A | 10/1998 | Hitz et al. ............... 707/203 |
| 5,875,202 A | 2/1999 | Venters et al. |
| 6,021,408 A * | 2/2000 | Ledain et al. ............... 707/823 |
| 6,023,706 A * | 2/2000 | Schmuck et al. ......... 707/999.2 |
| 6,108,812 A | 8/2000 | Born |
| 6,321,358 B1 | 11/2001 | Anderson |
| 6,467,060 B1 | 10/2002 | Malakapalli et al. |

(Continued)

FOREIGN PATENT DOCUMENTS

| JP | 05-108443 | 4/1993 | ............. G06F 12/00 |
| JP | 08-227371 | 9/1996 | ............. G06F 12/00 |

(Continued)

OTHER PUBLICATIONS

Piernas et al., "The Design of New Journaling File Systems: The DualFS Case", Feb. 2007, IEEE.*

(Continued)

*Primary Examiner* — Apu Mofiz
*Assistant Examiner* — Sheryl Holland
(74) *Attorney, Agent, or Firm* — Mattingly & Malur, PC

(57) ABSTRACT

Embodiments of the present invention allow multiple checkpoints to be taken so that multiple versions of the filesystem, including a working version and at least two checkpoint versions, can be maintained over time. Specifically, at least three "superblock" root structures are used to manage multiple instantiations of the filesystem. The superblocks are preferably stored in fixed locations within the storage system for easy access, although they may alternatively be stored in other ways. The number of superblocks may be fixed or variable.

31 Claims, 22 Drawing Sheets

(56) References Cited

U.S. PATENT DOCUMENTS

| | | | |
|---|---|---|---|
| 6,618,794 B1 | 9/2003 | Sicola et al. | 711/154 |
| 6,868,414 B2 | 3/2005 | Khanna et al. | 707/3 |
| 6,981,104 B2 | 12/2005 | Prabhu | 711/144 |
| 6,983,296 B1 | 1/2006 | Muhlestein et al. | 707/206 |
| 7,024,618 B2 | 4/2006 | Luick | |
| 7,039,663 B1 | 5/2006 | Federwisch et al. | 707/205 |
| 7,076,509 B1 | 7/2006 | Chen et al. | 707/202 |
| 7,120,767 B2 | 10/2006 | Hara et al. | 711/161 |
| 7,191,382 B2 | 3/2007 | James et al. | |
| 7,194,672 B2 | 3/2007 | Kim et al. | |
| 7,200,235 B1 | 4/2007 | Trimberger | |
| 7,203,890 B1 | 4/2007 | Normoyle | |
| 7,225,204 B2 | 5/2007 | Manley et al. | 707/200 |
| 7,600,151 B2 * | 10/2009 | Chen | 714/8 |
| 7,664,791 B1 * | 2/2010 | Hamilton | 707/999.202 |
| 7,689,599 B1 * | 3/2010 | Shah et al. | 714/19 |
| 7,747,663 B2 * | 6/2010 | Atkin et al. | 707/822 |
| 7,818,535 B1 * | 10/2010 | Bono et al. | 711/173 |
| 2003/0088591 A1 * | 5/2003 | Fish | 707/204 |
| 2003/0158862 A1 * | 8/2003 | Eshel et al. | 707/200 |
| 2003/0182301 A1 | 9/2003 | Patterson et al. | 707/102 |
| 2005/0097141 A1 | 5/2005 | Loafman et al. | 707/200 |
| 2007/0094310 A1 * | 4/2007 | Passey et al. | 707/204 |
| 2007/0276878 A1 * | 11/2007 | Zheng et al. | 707/202 |
| 2008/0040385 A1 | 2/2008 | Barrall et al. | 707/103 |

FOREIGN PATENT DOCUMENTS

| | | | |
|---|---|---|---|
| JP | 10-124400 | 5/1998 | G06F 12/16 |
| WO | WO 03/105026 | 12/2003 | G06F 17/30 |

OTHER PUBLICATIONS

A. Gud, "ChunkFS: A Recovery-Driven File System Design Approach", 2007, Kansas State University.*

Yamamoto, Translation of Japanese Office Action, dated Jul. 8, 2011, Application No. 2010-015860, 4 pages.

International Searching Authority, Invitation to Pay Additional Fees and, Where Applicable, Protest Fee (partial search report)—International Application No. PCT/US2008/079308, dated Jul. 9, 2009, 7 pages.

International Searching Authority, International Search Report—International Application No. PCT/US2008/079308, dated Sep. 17, 2009, together with the Written Opinion of the International Searching Authority, 17 pages.

Nelson, Mark, *File Verification Using CRC*, from http://www.dogma.net/markn/articles/crcman/crcman.htm, 1992, pp. 1-17.

Hill, Robin, FileRepair, from http://filerepair.sourceforge.net, 2004, pp. 1-3.

U.S. Appl. No. 11/841,353, filed Aug. 20, 2007, Apparatus and Method for Hardware-Based File System, Barrall et al.

* cited by examiner

MULTI-WAY CHECKPOINTS IN A DATA STORAGE SYSTEM

CROSS-REFERENCE TO RELATED APPLICATIONS

This patent application is a continuation-in-part of, and therefore claims priority from, U.S. patent application Ser. No. 12/015,192 entitled Validating Objects in a Data Storage System, which was filed on Jan. 16, 2008 in the name of Christopher J. Aston, and is hereby incorporated herein by reference in its entirety.

This patent application may also be related to one or more of the following patent applications, each of which is hereby incorporated herein by reference in its entirety:

U.S. patent application Ser. No. 12/164,745 entitled DYNAMIC WRITE BALANCING IN A DATA STORAGE SYSTEM, filed on Jun. 30, 2008;

U.S. Provisional Patent Application No. 60/979,561 entitled System, Device, and Method for Validating Data Structures in a Storage System, which was filed on Oct. 12, 2007;

U.S. patent application Ser. No. 09/879,798 entitled Apparatus and Method for Hardware Implementation or Acceleration of Operating System Functions, which was filed Jun. 12, 2001, now U.S. Pat. No. 6,826,615;

U.S. patent application Ser. No. 10/889,158 entitled Apparatus and Method for Hardware Implementation or Acceleration of Operating System Functions, which was filed on Jul. 12, 2004;

U.S. patent application Ser. No. 10/286,015 entitled Apparatus and Method for Hardware-Based File System, which was filed on Nov. 1, 2002 in the name of Geoffrey S. Barrall et al.; and U.S. patent application Ser. No. 11/841,353 entitled Apparatus and Method for Hardware-Based File System, which was filed on Aug. 20, 2007 in the name of Geoffrey S. Barrall et al.

FIELD OF THE INVENTION

The present invention relates to data storage systems, and in particular to multi-way checkpoints in a data storage system.

BACKGROUND

U.S. patent application Ser. No. 10/286,015 entitled Apparatus and Method for Hardware-Based File System filed on Nov. 1, 2002 in the name of Geoffrey S. Barrall et al. and U.S. patent application Ser. No. 11/841,353 entitled Apparatus and Method for Hardware-Based File System filed on Aug. 20, 2007 in the name of Geoffrey S. Barrall et al., both of which are hereby incorporated herein by reference in their entireties, describe various filesystem structures that permit, among other things, a file server to maintain two copies of a filesystem, namely a current version of the filesystem and a prior "checkpoint" version of the filesystem. Specifically, the filesystem is maintained using tree structures that include a special root node that is actually a pair of structures referred to as the left hand side (LHS) and right hand side (RHS). In practice, one side is used to hold a "checkpoint" copy of the filesystem while the other side is used for ongoing management of the filesystem (including creation, deletion, and modification of filesystem objects). From time to time, the roles of the two sides reverse so that a "checkpoint" is taken using the side of the structure that was being used for ongoing management of the filesystem and ongoing management of the filesystem continues using the side of the structure that held the previous "checkpoint." Two so-called dynamic superblocks are maintained for keeping track of the current and checkpoint versions of the filesystem.

One purpose of the "checkpoint" is to store a copy of the filesystem in case an error occurs during the ongoing management of the filesystem. Under certain circumstances, the filesystem may be reverted to the "checkpoint" version. One risk in such a system is that both the current version of the filesystem and the "checkpoint" version may become corrupted. Another risk is that an important piece of information will be removed or changed, and neither the current version of the filesystem nor the "checkpoint" version will include the original piece of information.

SUMMARY OF THE INVENTION

In accordance with one aspect of the invention there is provided a method for maintaining a plurality of checkpoint versions of a filesystem in a data storage system. The method involves maintaining at least three superblocks in the data storage system, each superblock representing a version of the filesystem including a working version of the filesystem represented by a designated current superblock and at least two checkpoint versions of the filesystem represented by the other superblocks; maintaining a plurality of indirection objects in the data storage system, wherein each superblock includes a reference to one of the indirection objects such that each indirection object is referenced by at least one of the superblocks; and at a designated checkpoint, retaining a copy of the working version of the filesystem including the indirection object referenced by said designated current superblock as a new checkpoint version using a first designated superblock and continuing to maintain the working version of the filesystem using a second designated superblock, wherein the new checkpoint version supplants an earlier checkpoint version.

In accordance with another aspect of the invention there is provided apparatus for maintaining a plurality of checkpoint versions of a filesystem. The apparatus includes at least one storage device and a storage processor in communication with the at least one storage device. The storage processor is configured for maintaining at least three superblocks in the data storage system, each superblock representing a version of the filesystem including a working version of the filesystem represented by a designated current superblock and at least two checkpoint versions of the filesystem represented by the other superblocks; maintaining a plurality of indirection objects in the data storage system, wherein each superblock includes a reference to one of the indirection objects such that each indirection object is referenced by at least one of the superblocks; and at a designated checkpoint, retaining a copy of the working version of the filesystem including the indirection object referenced by said designated current superblock as a new checkpoint version using a first designated superblock and continuing to maintain the working version of the filesystem using a second designated superblock, wherein the new checkpoint version supplants an earlier checkpoint version.

In various alternative embodiments, the at least three superblocks may be stored at fixed locations within the data storage system.

In one exemplary embodiment, said first designated superblock is said designated current superblock and said second designated superblock is a selected one of the other superblocks. The superblocks may be logically arranged as a circular list, in which case said second designated superblock is the next successive superblock in the circular list following said first designated superblock.

In another exemplary embodiment, said second designated superblock is said designated current superblock and said first designated superblock is a selected one of the other superblocks.

In another exemplary embodiment, continuing to maintain the working version of the filesystem using said second designated superblock may involve initially including in said second designated superblock a reference to the indirection object referenced by said designated current superblock; and upon modification of the indirection object referenced by said designated current superblock, creating a new version of said indirection object and including in said second designated superblock a reference to said new version.

In another exemplary embodiment, continuing to maintain the working version of the filesystem using said second designated superblock may involve creating a new version of said indirection object upon retaining the copy of the working filesystem and including in said second designated superblock a reference to said new version.

In various alternative embodiment, the number of superblocks may be fixed or use-configurable.

In exemplary embodiments, a distinct checkpoint number or other identifier may be included in each superblock associated with a checkpoint version of the filesystem.

In exemplary embodiments, the indirection objects may be implemented as pseudo-files that map each of a plurality of object numbers to a sector address of a root node associated with a corresponding filesystem object.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
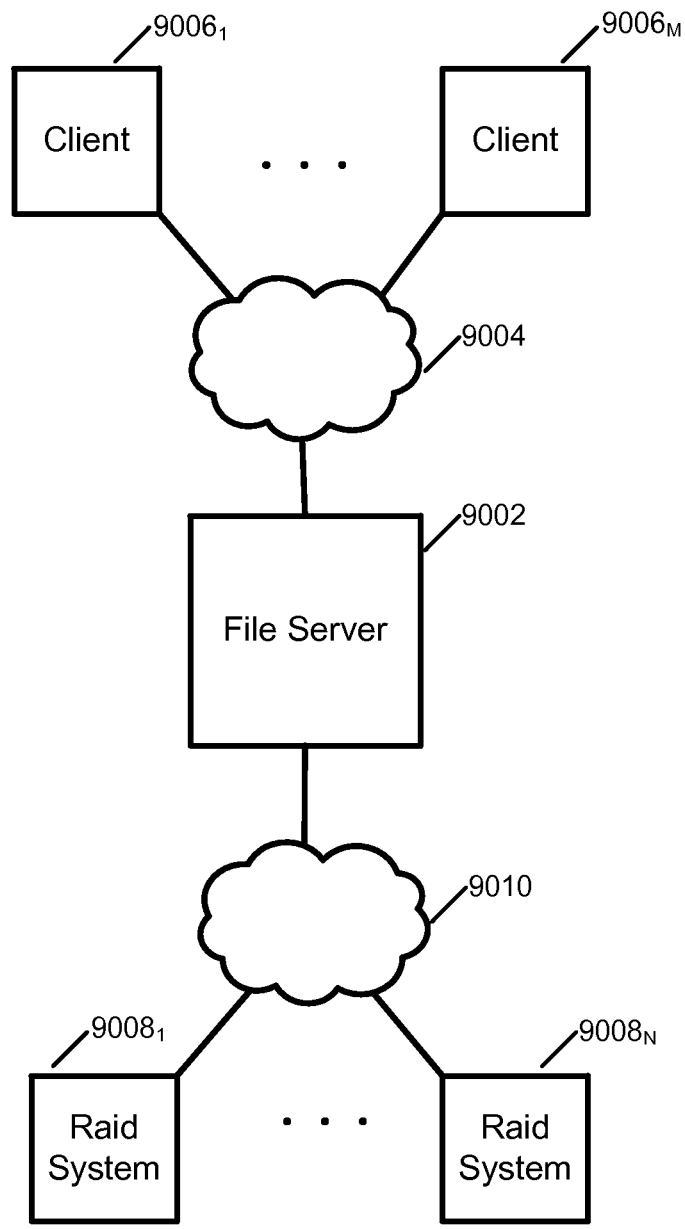
FIG. 1 is a schematic block diagram of a file storage system in accordance with an exemplary embodiment of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually.

A "set" of values may include one or more values.

Headings are used below for convenience and are not to be construed as limiting the present invention in any way.

Exemplary Filesystem

Embodiments of the present invention allow multiple checkpoints to be taken so that multiple versions of the filesystem can be maintained over time. Specifically, multiple separate root structures (referred to hereinafter as "dynamic superblocks" or "DSBs") are used to manage multiple instantiations of the filesystem. The DSBs are preferably stored in fixed locations within the storage system for easy access, although the DSBs may alternatively be stored in other ways. There are typically more than two DSBs, and the number of DSBs may be fixed or variable. There is no theoretical limit to the number of DSBs (although there may be practical limits for various implementations). In this way, if it becomes necessary or desirable to revert the filesystem back to a previous "checkpoint," there are multiple "checkpoints" from which to choose, providing a better chance that there will be an intact version of the filesystem to which the filesystem can be reverted or a checkpoint that contains a particular version of the filesystem.

FIG. 1 is a schematic block diagram of a file storage system in accordance with an exemplary embodiment of the present invention. Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems $9008_1$-$9008_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 includes a storage processor for managing one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based filesystem including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 9002 is configured to use one or more SDs, which can be from a single RAID system or from multiple RAID systems. The file server 9002 can normally interrogate the RAID systems to find out whether each SD is primary or secondary. The method of controlling which SDs are used by the file server 9002 is referred to herein as "licensing." Thus, in practice, the file server 9002 will typically be licensed for some SDs and unlicensed for others.

Internally, the file server 9002 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Filesystem Tree Structure

The file server 9002 stores various types of objects in the filesystem. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. An software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

An instantiation of the filesystem is managed using a tree structure having root node (referred to as a dynamic superblock or DSB) that is preferably stored at a fixed location within the storage system. Among other things, storing the DSB at a fixed location makes it easy for the file server 9002 to locate the DSB. The file server 9002 may maintain multiple DSBs to store different versions of the filesystem representing different checkpoints (e.g., a current "working" version and one or more "checkpoint" versions). In an exemplary embodiment, the DSB includes a pointer to an indirection object (described in detail below), which in turn includes pointers to other objects.

Figure 2:
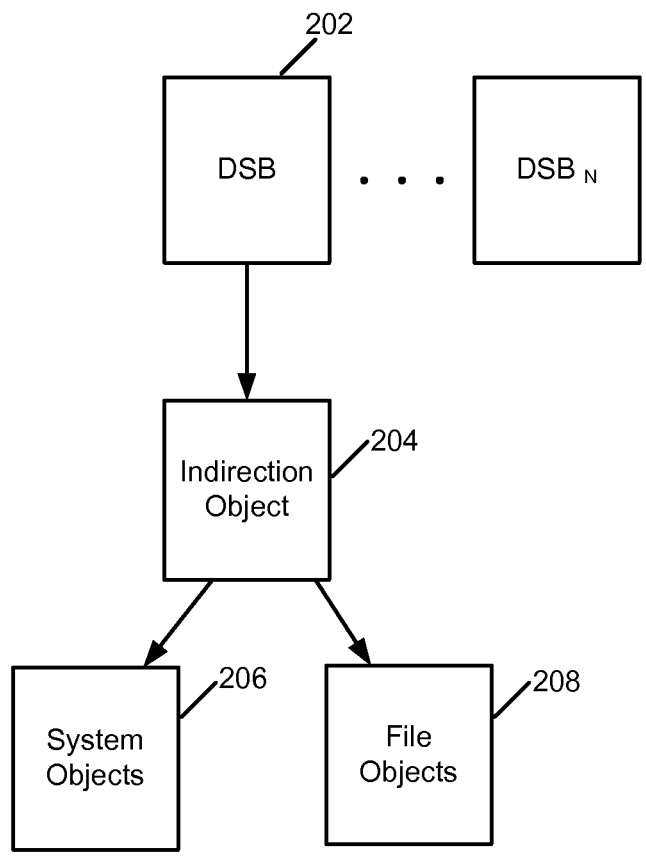
FIG. 2 is a schematic block diagram showing the general format of a filesystem in accordance with an exemplary embodiment of the present invention.

FIG. 2 is a schematic block diagram showing the general format of a filesystem instantiation in accordance with an exemplary embodiment of the present invention. The DSB 202 is a special structure that represents the root of the filesystem tree structure. Among other things, the DSB 202 includes a pointer to an indirection object 204, which in turn includes pointers to other objects in the filesystem including system objects 206 and file objects 208.

In embodiments of the present invention, N dynamic superblocks (N>2) are maintained for a filesystem, only one of which is considered to be the most up to date at any given point in time. The number of DSBs may be fixed or configurable. The DSBs are located at fixed locations and are used to record the state of the checkpoints on the disk. Each DSB points to an indirection object.

Among other things, the following information is stored in each dynamic superblock:

The checkpoint number associated with this dynamic superblock.

The handle of the modified checkpoint objects list object for this checkpoint.

The object number of the modified retained objects list object from the last retained checkpoint.

The state of this checkpoint (i.e., whether or not a checkpoint has been created).

A CRC and various other information to allow the DSB and other structures (e.g., the indirection object) to be checked for validity.

In an exemplary embodiment, the DSBs are treated as a circular list (i.e., the first dynamic superblock is considered to successively follow the last dynamic superblock), and each successive checkpoint uses the next successive dynamic superblock in the circular list. When the file server 9002 opens the volume, it typically reads in all dynamic superblocks and performs various checks on the DSBs. The DSB having the latest checkpoint number with the checkpoint state marked as completed and various other sanity checks passed is considered to represent the latest valid checkpoint on this volume. The file server 9002 begins using the next DSB in the circular list for the next checkpoint.

The general format of the indirection object 204 is discussed below.

Object Tree Structure

Generally speaking, each object in the filesystem, including the indirection object 204, each of the system objects 206, and each of the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 3:
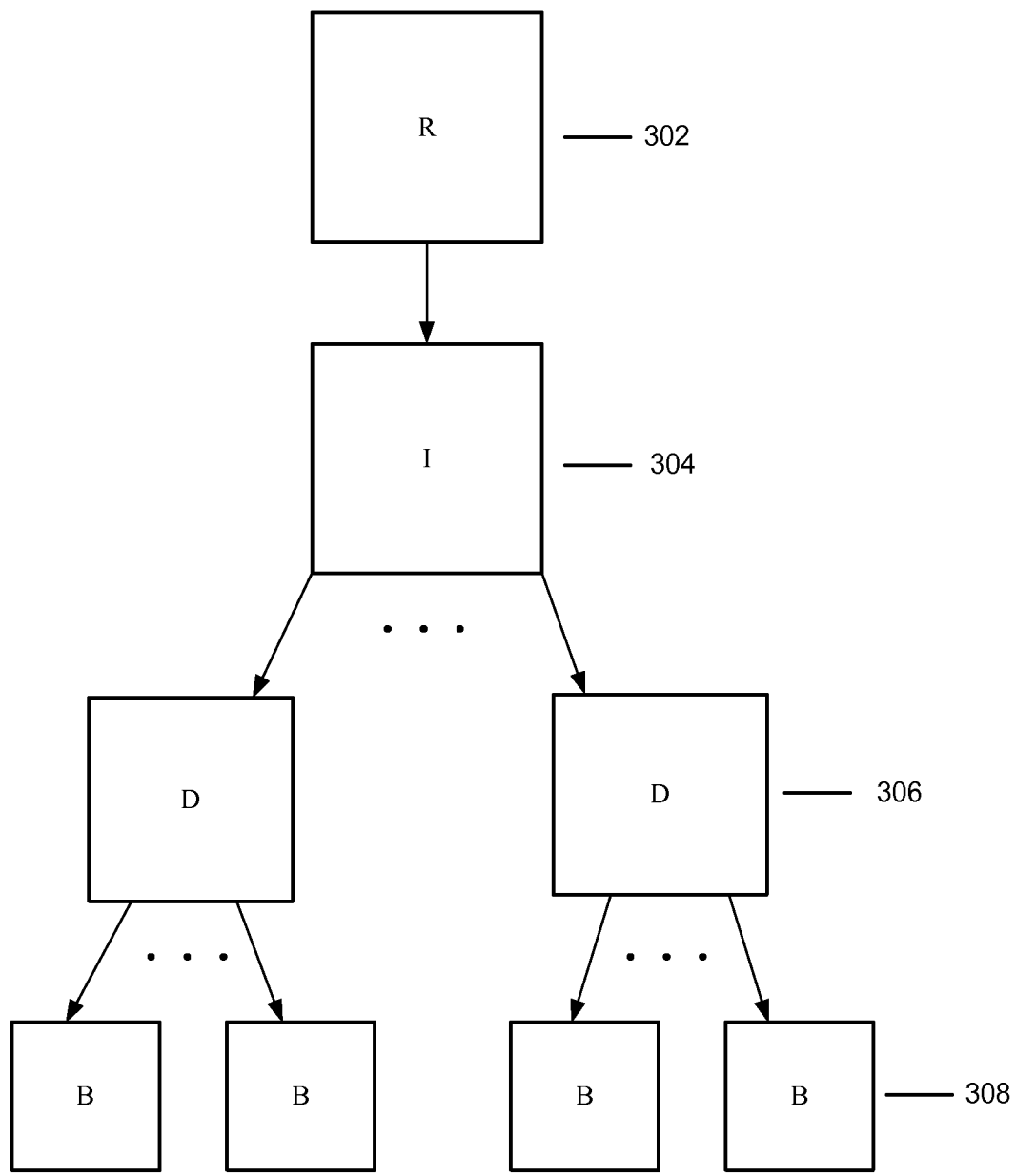
FIG. 3 is a schematic block diagram showing the general format of an object tree structure in accordance with an exemplary embodiment of the present invention.

FIG. 3 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

Figure 4:
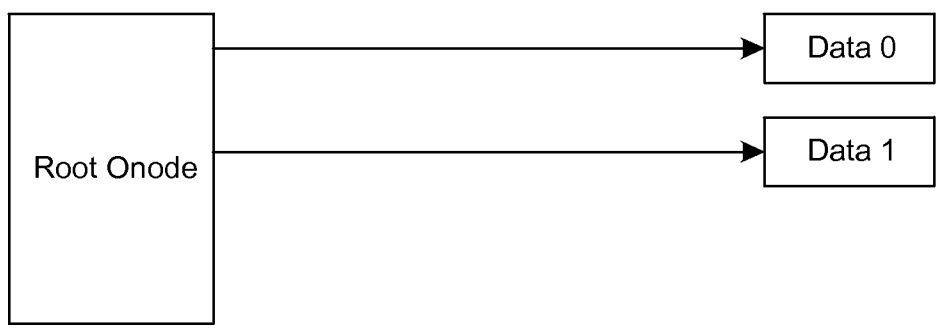
FIG. 4 is a block diagram showing use of a root onode with no other onodes in accordance with an exemplary embodiment of the present invention.

As data is added to the object, it is first of all put into data blocks pointed to directly from the root node. This is illustrated in the diagram of FIG. 4, showing use of a root node with no other nodes. Note that, for the sake of simplicity in this and all the following diagrams, the root node and direct node are shown as having only two data pointers, and the indirect node is shown as only having two indirect or direct node pointers.

Figure 5:
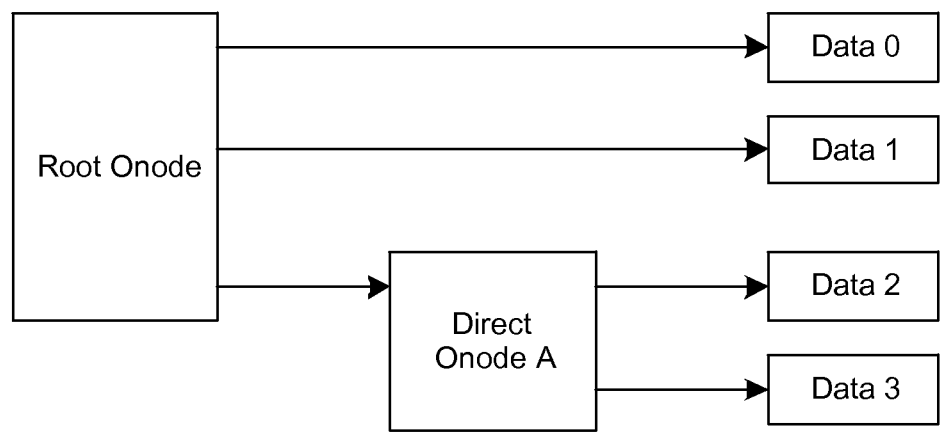
FIG. 5 is a block diagram showing employment of a root onode with a direct onode in accordance with an exemplary embodiment of the present invention.

Once all the direct block pointers in the root node are filled, then a direct node A is created with a pointer from the root node to the direct node. FIG. 5 shows employment of a root node with this direct node A. Note that the root node has multiple data block pointers but only a single pointer to either a direct or an indirect node.

Figure 6:
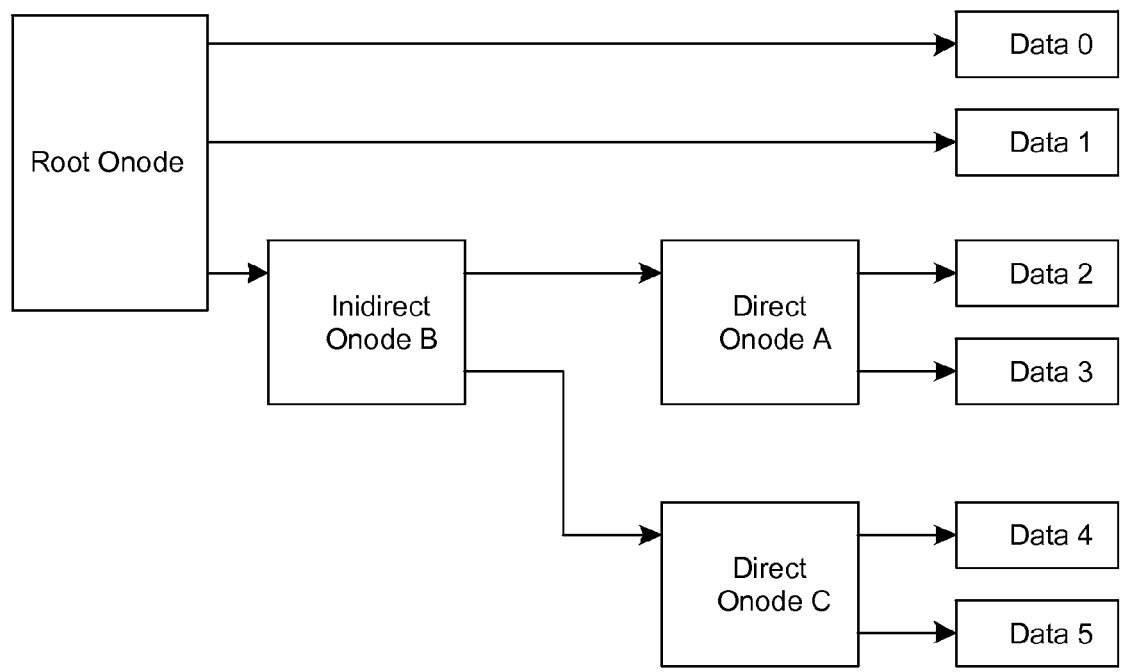
FIG. 6 is a block diagram showing employment of a root onode with an indirect onode as well as direct onodes in accordance with an exemplary embodiment of the present invention.

If the data in the object grows to fill all the data pointers in the direct node, then an indirect node B is created, as illustrated in FIG. 6. FIG. 6 shows employment of a root node with an indirect node as well as direct nodes. The pointer in the root node which was pointing to the direct node A, is changed to point at the indirect node B, and the first pointer in the indirect node B is set to point at the direct node A. At the same time a new direct node C is created, which is also pointed to from the indirect node B. As more data is created more direct nodes are created, all of which are pointed to from the indirect node.

Figure 7:
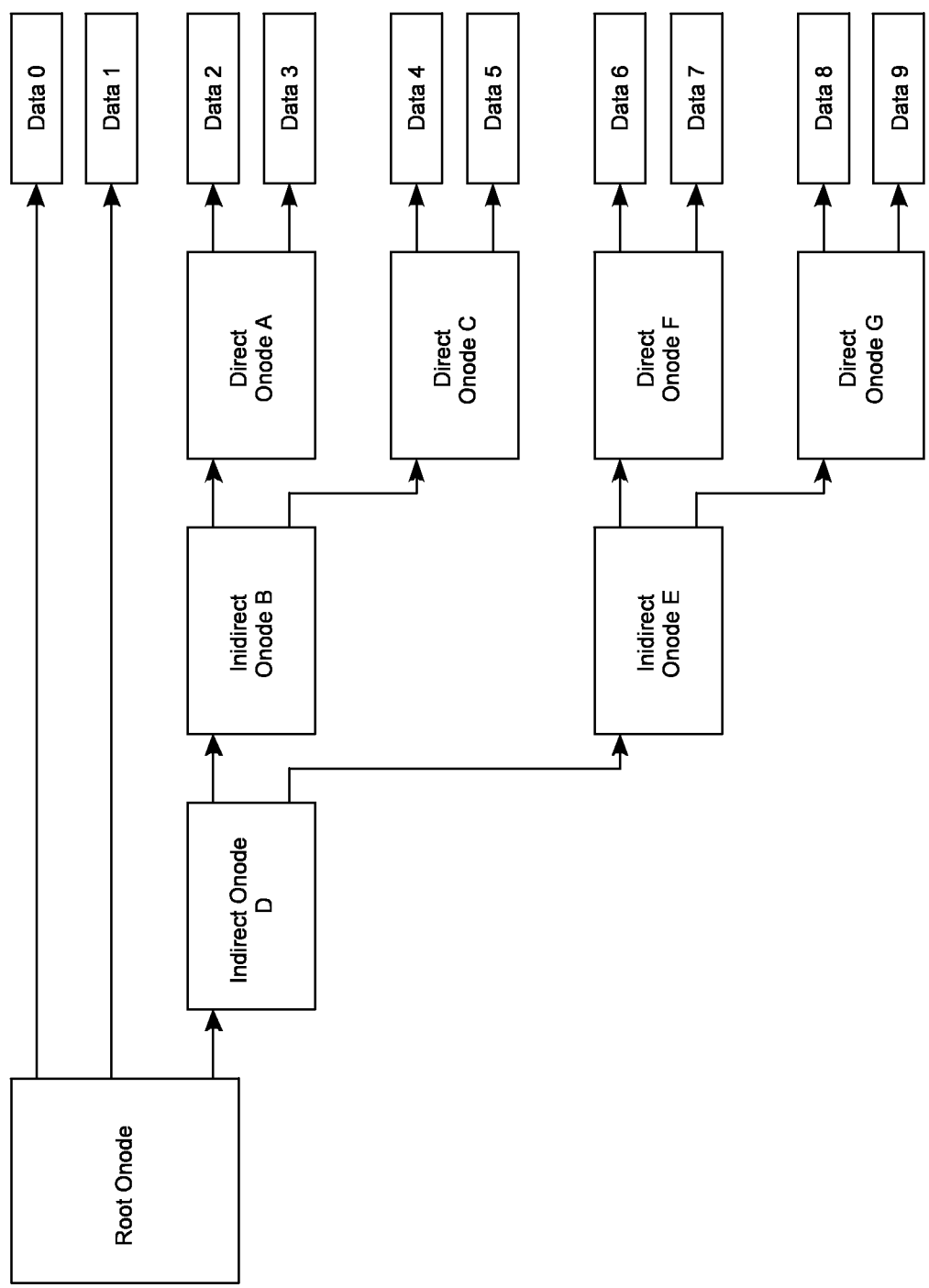
FIG. 7 is a block diagram illustrating use of multiple layers of indirect onodes placed between the root onode and the direct onodes in accordance with an exemplary embodiment of the present invention.

Once all the direct node pointers in the indirect node B have been used another indirect node D is created which is inserted between the root node and the first indirect node B. Another indirect node E and direct node F are also created to allow more data blocks to be referenced. These circumstances are shown in FIG. 7, which illustrates use of multiple layers of indirect nodes placed between the root node and the direct nodes.

This process of adding indirect nodes to create more levels of indirection is repeated to accommodate however much data the object contains.

The object root node includes a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node. Also in the object root node is a parameter to identify the type of object for which the object root node is providing metadata. The object type may, for example, be any of freespace, file, or directory. In addition to object type, the object root node also has a parameter for the length of the object in blocks.

The object root node also carries a series of pointers. One of these is a pointer to any immediately preceding version of the object root node. If it turns out that a retained checkpoint has been taken for the pertinent checkpoint, then there may have been stored an immediately preceding version of the object root node in question, and the pointer identifies the sector number of such an immediately preceding version of the object root node.

For the actual data to which the object root node corresponds, the object root node includes a separate pointer to each block of data associated with the corresponding object. The location of up to 18 data blocks is stored in the object root node. For data going beyond 18 blocks, a direct node is additionally required, in which case the object root node also has a pointer to the direct node, which is identified in the object root node by sector number on the disk.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, irrespective of the file's fragmentation.

Various embodiments of the present invention may include mechanisms to facilitate creation of large files, which are typically sparse files that are filled with zeros when first created.

One such mechanism allows zero-filled data blocks to be allocated without actually writing zeros into the data blocks. Specifically, the object root nodes and the direct nodes include a flag for each block pointer to indicate whether the corresponding block is logically filled with zeros (the block does not actually need to be filled with zeros). Thus, for example, when a data block is allocated, rather than filling the data block with zeros, the bit associated with the data block can be set to indicate that the data block is zero-filled, and read accesses to that data block will return zeros without actually reading data from the data block.

A similar mechanism allows files to be created without actually allocating all data blocks and nodes for the file. Specifically, pointers to blocks and other nodes may include a bit to indicate whether or not the block or other node has been actually created. In a case where the relevant blocks and nodes have not yet been created, then blocks and nodes are created as necessary to accommodate write requests, and the allocation bit is toggled accordingly. Note that creating a block requires allocation of space, writing the data to the block, and setting the bit flags for the pertinent nodes. In one particular exemplary embodiment, this mechanism is only used to create files without allocating all data blocks; other file nodes are allocated as described above.

transaction log, as well has being maintained on the fly in a metadata cache.

Node structure may also be established, in an exemplary embodiment, in a manner to further reduce disk writes in connection with node structures. In the end, the node structure needs to accommodate the storage not only of file contents but also of file attributes. File attributes include a variety of parameters, including file size, file creation time and date, file modification time and date, read-only status, and access permissions, among others. This connection takes advantage of the fact that changing the contents of an object root node can be performed frequently during a given checkpoint, since the object root node is not yet written to disk (i.e., because disk writes of object root nodes are delayed, as discussed above). Therefore, in an exemplary embodiment, a portion of the object root node is reserved for storage of file attributes.

More generally, the following structures for storage of file attributes are defined in an exemplary embodiment:

enode (little overhead to update, limited capacity). This structure is defined in the object root node and is 128 bytes in an exemplary embodiment.

software metadata object (expensive in overhead to update, near infinite capacity). This is a dedicated object for storage of metadata and therefore has its own storage locations on disk; the object is identified in the enode.

Thus, in an exemplary embodiment, each object root node stores the following types of information:

The checkpoint number.
The data length for this version of the object.
The number of levels of indirection used in the runlist for this object.
The type of the object. This is primarily used as a sanity check when a request comes in to access the object.
A pointer to an older root node version made for a retained checkpoint (if there is one).
A pointer to a newer root node version (will only be valid if this is a copy of a root node made for a retained checkpoint).
Up to 19 data block descriptors. Each data block descriptor includes a pointer to a data block, the checkpoint number, and a bit to say whether the block is zero filled.
A single pointer to either a direct node or an indirect node.
The 128 bytes of enode data for this object.
A CRC and various sanity dwords to allow the root node to be checked for validity.

As discussed below, an object may include copies of root nodes that are created each time a retained checkpoint is taken. The pointer to the older root node version and the pointer to the newer root node version allow a doubly-linked list of root nodes to be created including the current root node and any copies of root nodes that are created for retained checkpoints. The doubly-linked list facilitates creation and deletion of retained checkpoints.

As discussed above, the indirect node provides a level of indirection between the root node and the direct node. The following information is stored in the indirect node in an exemplary embodiment:

The checkpoint number.
Pointers to either indirect or direct nodes (e.g., up to 122 such pointers).
A CRC and various sanity dwords to allow the indirect node to be checked for validity.

As discussed above, the direct node provides direct pointers to data blocks on the disk. The following information is stored in the direct node in an exemplary embodiment:

The checkpoint number.
A number of data block descriptors (e.g., up to 62 such descriptors). Each data block descriptor includes a pointer to a data block, the checkpoint number, and a bit to say whether the block is zero filled.
A CRC and various sanity dwords to allow the indirect node to be checked for validity.

As data is deleted from the object and data blocks and direct and indirect nodes are no longer required, they are returned to the free space allocation controller.

In accordance with one embodiment, the number of levels of indirection decreases as the object gets smaller, until all the data in the object can be referenced via the direct block pointers in the root node, at which point all the remaining direct and indirect nodes are freed and the indirection level will be set to zero.

If a write operation to a particular file object has a start offset that is beyond the current end of the object or the length of the object is set to be greater than the current length, then the undefined portion of the object (e.g., between the current end of the object and the start of newly written data) is typically filled with zeroes. In a typical implementation, this involves allocating disk blocks for all zero-filled portions of the object and filling those disk blocks with zeros. For a 1 GB file, this might take of the order of 10 seconds. For a 1 TB file, it might take on the order of 3 hours.

In an exemplary embodiment of the present invention, rather than actually zero-filling the data blocks associated with undefined portion of the object, the contents of those data blocks are left unwritten, and a bit within each data block pointer is used to indicate that the block is deemed to be zero-filled. If the file server 9002 (and, in particular, the Object Store sub-module) sees this bit set, then it knows that the block should be filled with zeroes, even though on disk it may contain something completely different. If the block is read, then the file server 9002 returns zeroes for this block rather than returning its actually on-disk contents. If the block is written in such a way that the write does not fill the entire block, then the file server 9002 will write zeroes to the portion of the block that is not being written and will then reset the "zero-filled" bit for this block.

Another concern with setting the length of an object to some very large value is the time it takes to allocate the data blocks and create the required direct and indirect node structures. For example, in an exemplary embodiment using a disk block size of 4K, a 1 TB object requires approximately 4 million direct nodes as well as a lesser number of indirect nodes. This might take in the order of 40 seconds to write to disk. Also the free space allocation of all the data blocks required, and the subsequent updates to the free space bitmap, would significantly add to this time. If a checkpoint were to be taken immediately after the file creation begins, the entire system generally would stop servicing requests (to any volumes) for the whole of this time.

In an alternative embodiment of the invention, this issue may be addressed by not actually allocating disk blocks for the zero-filled portions of the file, as discussed above. This means that when the object store sees a write to a zero filled block, it would first have to allocate disk space for that block and put a pointer to it in the relevant node structure.

In yet another alternative embodiment, in addition to not actually allocating disk blocks for the zero-filled portions of the file, this issue may be address by also not creating the corresponding node structures either. To implement this aspect, each node pointer could include a bit to indicate whether or not the node to which it points is allocated. If the node is not allocated, when an operation comes along which requires that node to be valid, only then would disk space be allocated for it and the correct pointer inserted. In this way, a huge zero-filled object may have only a root node, which can be created very quickly.

Object Numbers and the Indirection Object

Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

Figure 8:
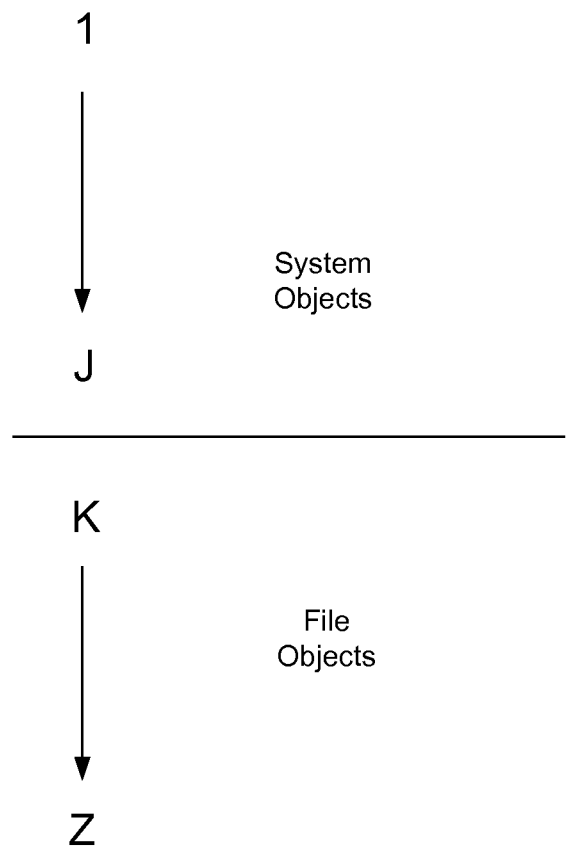
FIG. 8 shows a representation of object number assignments for an exemplary embodiment of the present invention.

FIG. 8 shows a representation of object number assignments for an exemplary embodiment of the present invention. Specifically, the filesystem may include Z object numbers (where Z is variable and may grow over time as the number of objects increases). A certain range of object numbers is reserved for system objects 206 (in this example, object numbers 1-J), and the remaining object numbers (in this example, object numbers K-Z) are assigned to file objects 208. Typically, the number of system objects 206 is fixed, while the number of file objects 208 may vary.

Figure 9:
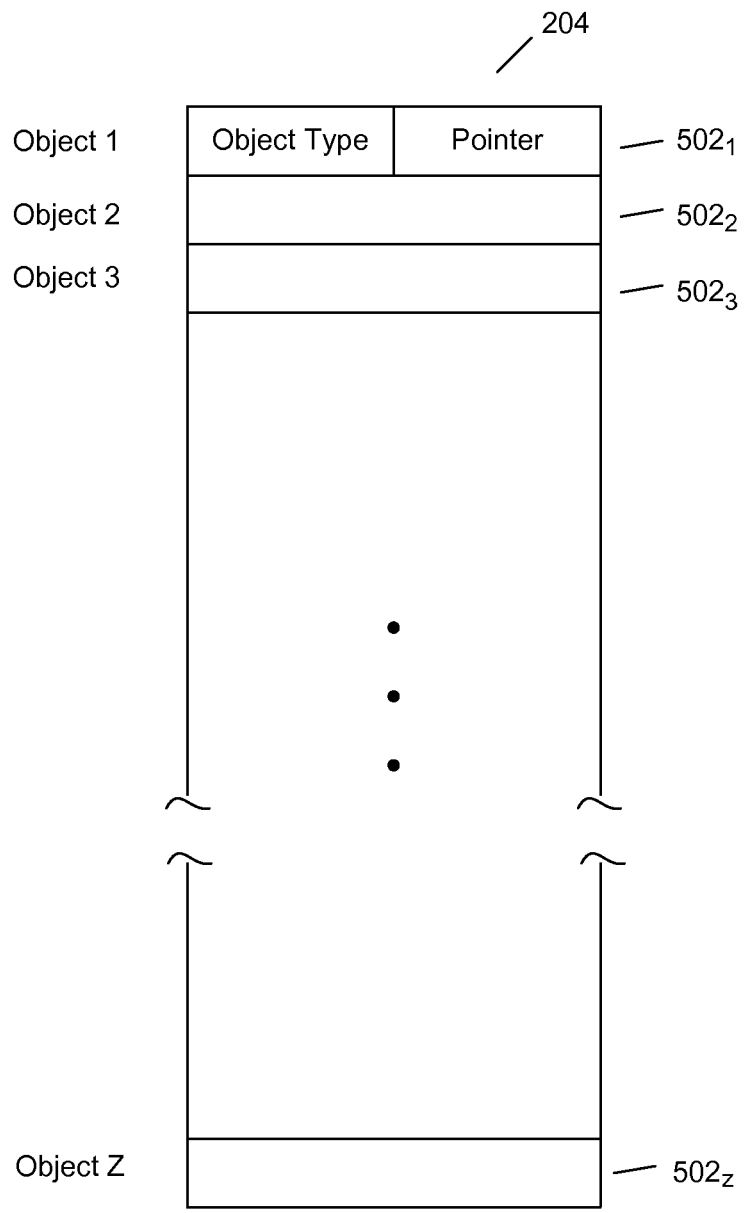
FIG. 9 is a schematic block diagram showing the general format of the indirection object in accordance with an exemplary embodiment of the present invention.

In an exemplary embodiment, the indirection object 204 is logically organized as a table, with one table entry per object indexed by object number. As shown in FIG. 9, each entry 502 in the table includes an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free.

The pointer field of each used table entry includes a pointer to the root node of the object. When an object is created, an object root node is created (as discussed above), and an object number is assigned to the object. A pointer to the object root node is stored in the indirection object 204, specifically in the table entry associated with the assigned object number. Therefore, the file server 9002 can easily locate the object root node of any object based on its object number, specifically by indexing into the indirection object table structure and accessing the pointer field. Initially, the root node of such an "empty" object has no pointers to any indirect nodes, direct nodes, or data blocks, although data blocks, indirect nodes, and direct nodes may be added to the object tree structure over time.

The pointer fields of free table entries are used to maintain one or more free object number lists (and preferably two singly-linked, non-circular free object number lists, for example, as described in U.S. Provisional Patent Application No. 60/979,561 entitled System, Device, and Method for Validating Data Structures in a Storage System, which was filed on Oct. 12, 2007 and is hereby incorporated herein by reference in its entirety.

Specifically, the table entry associated with each free object number includes a reference to a next free object number in its free object number list rather than a pointer to the root node of an object. Because a free object number list is a singly-linked, non-circular list in an exemplary embodiment, the table entry associated with the last free object number in a free object number list includes a "null" reference (e.g., the value zero).

Theoretically, it would be possible to maintain a single free object number list in the indirection object. Free object numbers in the list could be recycled and removed from the list as new objects are created, and free object numbers could be added to the list as objects are deleted from the system.

In an exemplary embodiment of the invention, however, two separate free object number lists are maintained in the indirection object, one listing free object numbers that are immediately available for recycling and the other listing newly freed object numbers that are not immediately available for recycling. In this exemplary embodiment, the file server takes a "checkpoint" or "snapshot" of the filesystem from time to time (e.g., as discussed below or in U.S. patent application Ser. No. 10/286,015 entitled Apparatus and Method for Hardware-Based File System filed on Nov. 1, 2002 in the name of Geoffrey S. Barrall et al. and U.S. patent application Ser. No. 11/841,353 entitled Apparatus and Method for Hardware-Based File System filed on Aug. 20, 2007 in the name of Geoffrey S. Barrall et al., both of which are hereby incorporated herein by reference in their entireties), such that, at any give time, the file server has a "working copy" of the filesystem that may change, for example, as objects are created, deleted, and modified. For various reasons, it is important for this exemplary embodiment to ensure that, over time, different objects that are assigned a particular recycled object number are given different object handles. Therefore, in this exemplary embodiment, two free object number lists are used to ensure that a particular object number cannot be freed and reused within the same working copy of the filesystem (i.e., by adding freed object numbers to one list but allocating object numbers from the other list), and the bottom 32 bits of the current checkpoint number are included in the object handle when the object is created so that objects created in different checkpoints will have different handles. Thus, during any particular working copy of the filesystem, the file server recycles free object numbers from one list while adding newly freed object numbers to the other list. At each "checkpoint," the roles of the two lists are "swapped" so that object numbers freed during the previous checkpoint are available to be recycled while new object numbers that are freed during the current checkpoint are not available to be recycled during that checkpoint. If the list from which free object numbers are being recycled is empty when a new object is being created, then the indirection object is expanded in order to provide additional free object numbers (even though there may actually be some free object numbers in the other list). In practice, however, both lists will generally accumulate a number of free object numbers over time due to the role swapping at each checkpoint, so, in the steady state, the indirection object should not need to expand often.

In an exemplary embodiment, the DSB 202 includes a pointer to the indirection object 204 (and, more specifically, to the root node of the indirection object 204), and also includes two pointers, one for each of the free object number lists in the indirection object 204. Each pointer points to the table entry at the start of its respective free object number list. Because the DSB 202 is stored at a fixed location within the storage system and includes pointers to the indirection object 204 and the free object number lists within the indirection object 204, the file server 9002 can easily locate the indirection object 204 (and hence the root node of any other object) as well as free object number lists using the DSB 202.

Thus, with reference again to the table structure of the indirection object 204 shown in FIG. 4, the value in the object type field of a particular table entry will indicate whether the corresponding object number is used or free. If that object number is used, then the pointer field of that table entry will include a pointer to the root node of the corresponding object. If, however, that object number is free, then the pointer field of that table entry will include a reference to a next free object number in its free object number list.

Generally speaking, freed object numbers are added to the head of a free object number list, and recycled object numbers are also taken from the head of a free object number list.

As discussed in U.S. Provisional Patent Application No. 60/979,561 entitled System, Device, and Method for Validating Data Structures in a Storage System, which was incorporated by reference above, from time to time, it may be necessary or desirable to verify the indirection object 204, including the free object number list(s), in order to ensure that all free object numbers are included in the free object number list(s) and that no "used" object numbers are included in the free object number list(s). One way to verify the indirection object 204, including the free object number list(s), is to traverse each free object number list from the start to end to ensure that there are no loops and to ensure that the list ends with a null reference. However, in a working data storage system, it is not unusual for large numbers of objects to be created and deleted over time, such that the free object number list(s) can become quite long. Furthermore, the free object number lists are not ordered but instead are updated as object numbers happen to be used and freed, so traversing a free object number list would generally entail jumping around the indirection object 204 according to the references of the singly-linked list. Such traversal of a free object number list would generally be slow and inefficient.

Therefore, in an exemplary embodiment of the present invention, the indirection object table structure is traversed sequentially from top to bottom, and the "used" and "free" object numbers are tracked using a bitmap or other appropriate data structure. Specifically, if a particular object number is used, then the corresponding bit in the bitmap is marked; if that bit was already marked, then the indirection object is corrupted (e.g., because that "used" object number is erroneously referenced by an earlier "free" entry). If a particular object number is free, then the corresponding entry in the indirection object table structure includes a reference to the next free object number in the free object number list, so the bit corresponding to such next free object number is marked in the bitmap; if that bit was already marked, then the indirection object is corrupted (e.g., because the free object number list includes a "used" object number or because the free object number list includes a circular reference). After the entire indirection object table structure has been traversed, the two starting table entries, which are pointed to by the pointers in the DSB 202, are checked, and if either table entry is "used," then the indirection object is corrupted. Furthermore, after the entire indirection object table structure has been traversed, the only bits that should be left unmarked are the bits associated with the two starting table entries for the two free object number lists, which are pointed to by the pointers in the DSB 202. If either of those bits is marked, then the indirection object is corrupted. If any other bits in the bitmap are unmarked, then the corresponding object numbers are neither used nor included in the free object number lists, in which case the indirection object is usable (because such "unlinked" free entries will not be recycled in the normal course). Additional processing may be performed to ensure that each free object number list terminates with a null reference.

In various alternative embodiments, the bitmap could be initialized to all zeros, and a bit in the bitmap could be "marked" by setting the bit (i.e., to one); in this regard, a so-called "test-and-set" operation may be used to both test the value of the bit and set the bit in a single operation. Alternatively, the bitmap could be initialized to all ones and a bit in the bitmap could be "marked" by clearing the bit (i.e., to zero). Of course, other types of data structures and other types of marking schemes may be used in other embodiments. The present invention is not limited to the use of a bitmap or to any particular type of data structure or marking scheme.

In an exemplary embodiment, the indirection object may be implemented as a "pseudo-file" having no actual storage blocks. In an exemplary embodiment, instead of having pointers to actual data blocks in the object tree structure (e.g., as shown in FIG. 2), such pointers in the indirection object tree structure point to the root nodes of the corresponding objects. Thus, in an exemplary embodiment, the indirection object maps each object number to the sector address of the root node associated with the corresponding filesystem object. The indirection object tree structure can then be traversed based on an object number in order to obtain a pointer to the root node of the corresponding object.

In an exemplary embodiment, the indirection object "pseudo-file" is structured so that a common piece of code can be used to traverse the indirection object tree structure based on an object number in order to obtain a pointer to the root node of the corresponding object and to traverse other object tree structures based on a file offset in order to obtain a pointer to the corresponding data block. In such an embodiment, the object number is essentially converted into a virtual file offset, and then the indirection object tree structure is traversed in the same way that other object tree structures are traversed using an actual file offset. One advantage of having common code that can be used to traverse both the indirection object "pseudo-file" tree structure and other object tree structures is that a single logic block can be used for both functions, which is particularly advantageous for the tree traversal function in hardware.

Exemplary System Objects

As discussed above, the filesystem includes various types of system objects. Generally speaking, system objects have fixed, pre-defined object numbers, although certain system objects may have variable object numbers. The following is a description of some system objects in an exemplary embodiment of the present invention.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

Figure 10:
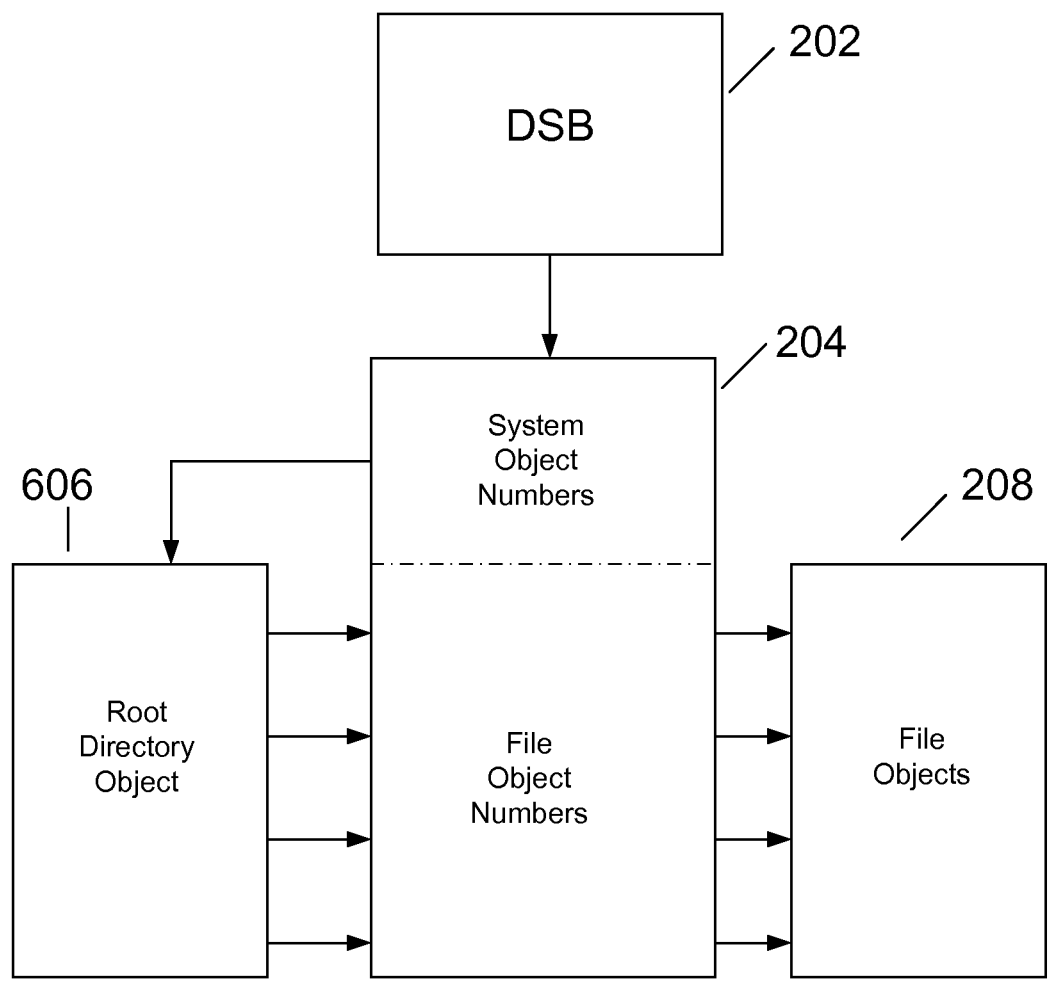
FIG. 10 is a schematic block diagram demonstrating the general relationship between the DSB, the indirection object, the root direction object, and the file objects, in accordance with an exemplary embodiment of the present invention.

FIG. 10 is a schematic block diagram demonstrating the general relationship between the DSB 202, the indirection object 204, the root directory object 606, and the file objects 208, in accordance with an exemplary embodiment of the present invention. As mentioned above, an entry in the indirection object maps the root directory object number to the disk address of the root directory object's root node, the root directory object maps file names to object numbers, and the indirection object maps object numbers to objects. Therefore, when the file server 9002 needs to locate an object based on the object's file name, the file server 9002 can locate the root directory object 606 via the indirection object (i.e., using the object number associated with the root directory object 606), map the file name to its corresponding object number using the root directory object 606, and then locate the object via the indirection object using the object number.

A free space bit map object is a system object (i.e., it has a root node and a fixed predetermined object number) that indicates free storage blocks in the file storage system. An entry in the indirection object maps the free space bit map object number to the disk address of the free space bit map object's root node.

A modified checkpoint objects lists object is a system object (i.e., it has a root node and a fixed predetermined object number) that identifies objects that have been created or modified during a checkpoint cycle. At the start of each checkpoint, a modified checkpoint objects list object is created. Each time a different object is created or modified as part of this checkpoint, its object number is written to the modified checkpoint objects list object so that, when the checkpoint is created, there is an object that lists all the objects created or modified in that checkpoint.

A free blocks object is a system object that is used to keep track of data blocks that have become unused by the filesystem during a particular checkpoint. The free blocks object lists the sector addresses that are available to be freed. The fact that a particular data block has become unused by the filesystem does not necessarily mean that the data block can be freed for reuse, since the data block may be associated with an earlier checkpoint and/or retained checkpoint. Thus, other mechanisms (e.g., a background cleanup task) are typically used to decide how and when blocks are available to be freed.

In one contemplated embodiment, the file storage system would maintain N free blocks objects for N checkpoints (where N is typically greater than two), with the indirection object including separate entries for the N free blocks objects using fixed predetermined free blocks object numbers (i.e., N entries in the indirection object). In such an embodiment, when a particular checkpoint is being deleted (e.g., the N+1th checkpoint), the file storage system would process the free blocks object associated with that checkpoint so that the information contained therein is not lost.

In an alternate contemplated embodiment, the file storage system could maintain more than N free blocks objects (even though only N checkpoints are maintained) so that the free blocks objects could be processed using a background cleanup process rather than a run-time process. In such an embodiment, since the number of free blocks objects in the system could vary, it would not be practical to have a fixed number of entries in the indirection object, so a directory of free blocks objects (e.g., a free blocks directory object) could be used instead. Here, a single entry in the indirection object could be used for the free blocks directory object, and the free blocks directory object could maintain pointers to the individual free blocks objects.

A retained checkpoint configuration object is a system object that is used to maintain a list of retained checkpoints. An entry in the indirection object maps the retained checkpoint configuration object number to the disk address of the retained checkpoint configuration object's root node. The retained checkpoint configuration object is discussed in further detail below.

Multi-Way Checkpoints

The processing of file system requests is delineated by a series of checkpoints that are scheduled to occur no less frequently than some user-specified interval, such as every 10 seconds. Checkpoints may be taken at other times such as, for example, if more than half of the non-volatile RAM being used for the current checkpoint is full, if the sector cache is becoming full, if the user requests a retained checkpoint (discussed below), or under other appropriate circumstances.

With respect to each successive checkpoint, there is stored, on disk, current file structure information that supersedes previously stored file structure information from the immediately preceding checkpoint. Checkpoints are numbered sequentially and are used to temporally group processing of file requests.

As discussed above, exemplary embodiments of the present invention maintain N DSBs (where N is greater than two, e.g., 16). The DSBs are used to take successive checkpoints.

Thus, at any given time, there is a current (working) version of the filesystem and one or more checkpoint versions of the filesystem. Because the storage system is typically quite dynamic, the current version of the filesystem will almost certainly begin changing almost immediately after taking a checkpoint. For example, filesystem objects may be added, deleted, or modified over time. In order to maintain checkpoints, however, none of the structures associated with stored checkpoints can be permitted to change, at least until a particular checkpoint is deleted or overwritten. Therefore, as objects in the current version of the filesystem are added, deleted, and modified, new versions of object tree structures are created as needed, and the various pointers are updated accordingly.

Figure 11:
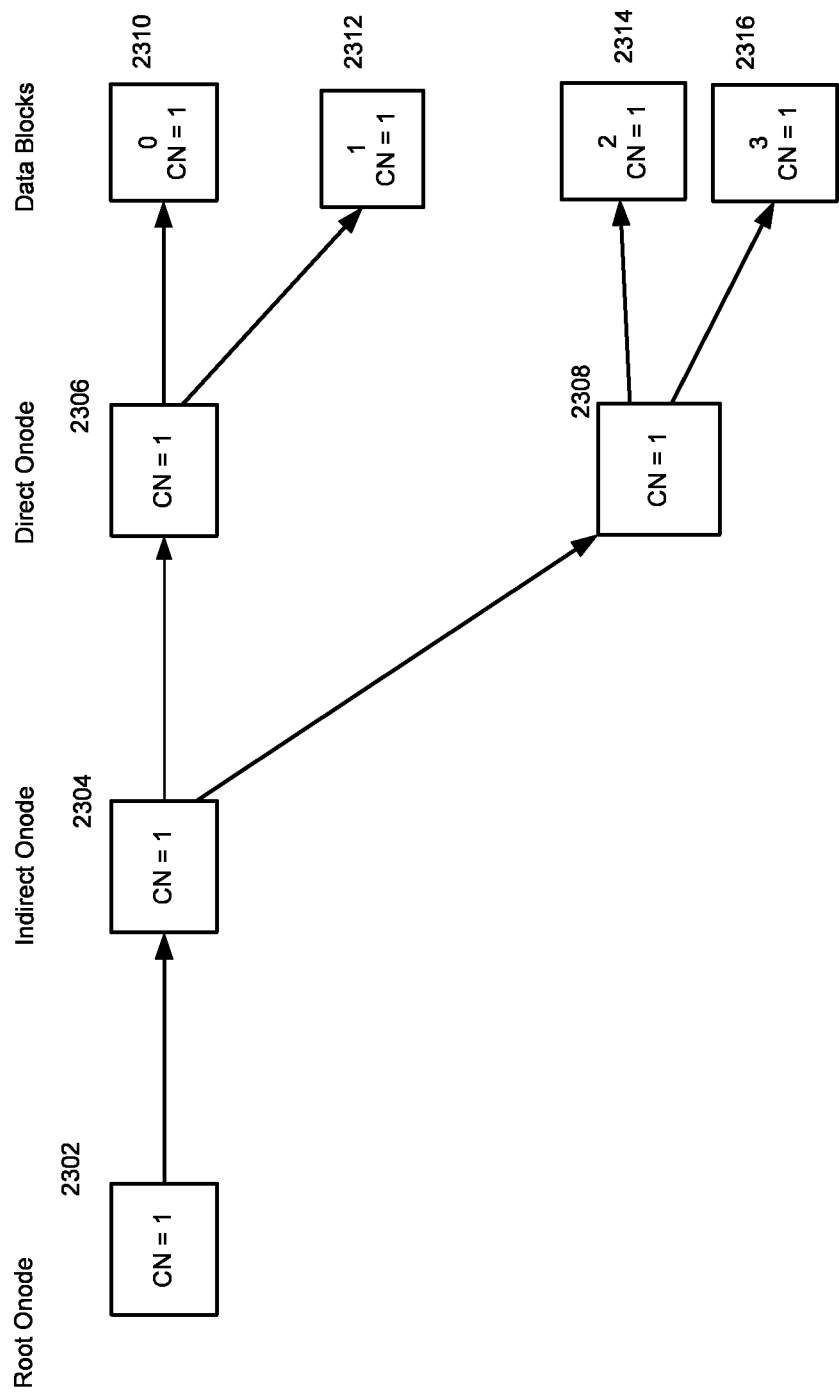
FIG. 11 is a schematic diagram that shows the structure of an exemplary object that includes four data blocks and various onodes at a checkpoint number 1 in accordance with an exemplary embodiment of the present invention.

For example, FIG. 11 schematically shows an object structure for an exemplary object that was created at a checkpoint number 1. The object includes four data blocks, namely data block 0 (2310), data block 1 (2312), data block 2 (2314), and data block 3 (2316). A direct node 2306 includes a pointer to data block 0 (2310) and a pointer to data block 1 (2312). A direct node 2308 includes a pointer to data block 2 (2314) and a pointer to data block 3 (2316). An indirect node 2304 includes a pointer to direct node 2306 and a pointer to direct node 2308. A root node 2302 includes a pointer to indirect node 2304. All nodes and all data blocks are marked with checkpoint number 1.

Figure 12:
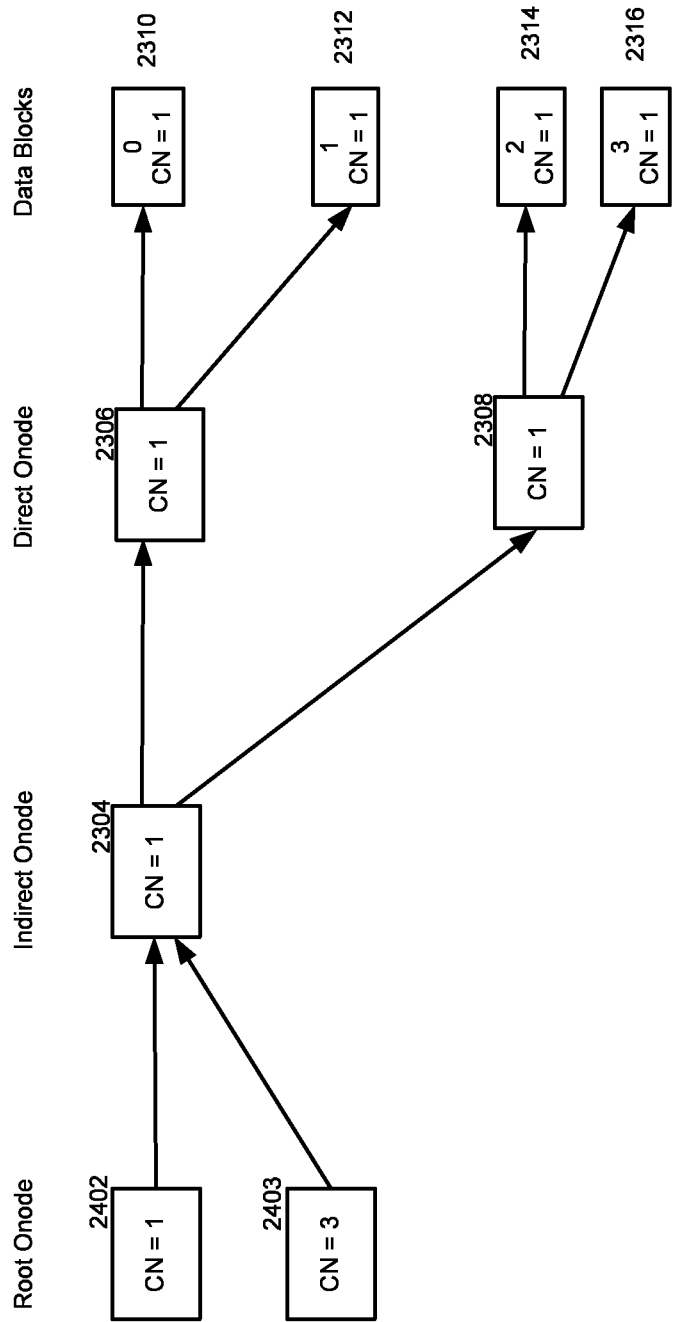
FIG. 12 is a schematic diagram that shows the structure of the exemplary object of FIG. 11 after a new root node is created for the modified object in accordance with an embodiment of the present invention.

Suppose now that data block 0 (2310) is to be modified in checkpoint number 3. Since root node 2402 is part of an earlier checkpoint, it cannot be modified. Instead, the Object Store sub-module of the file server 9002 saves a copy of the old root node 2302 to free space on the disk and marks this new root node with checkpoint number 3 (i.e., the checkpoint at which it was created). FIG. 12 schematically shows the object structure after creation of the new root node 2403. At this point, both root node 2402 and new root node 2403 point to indirect node 2304.

Figure 13:
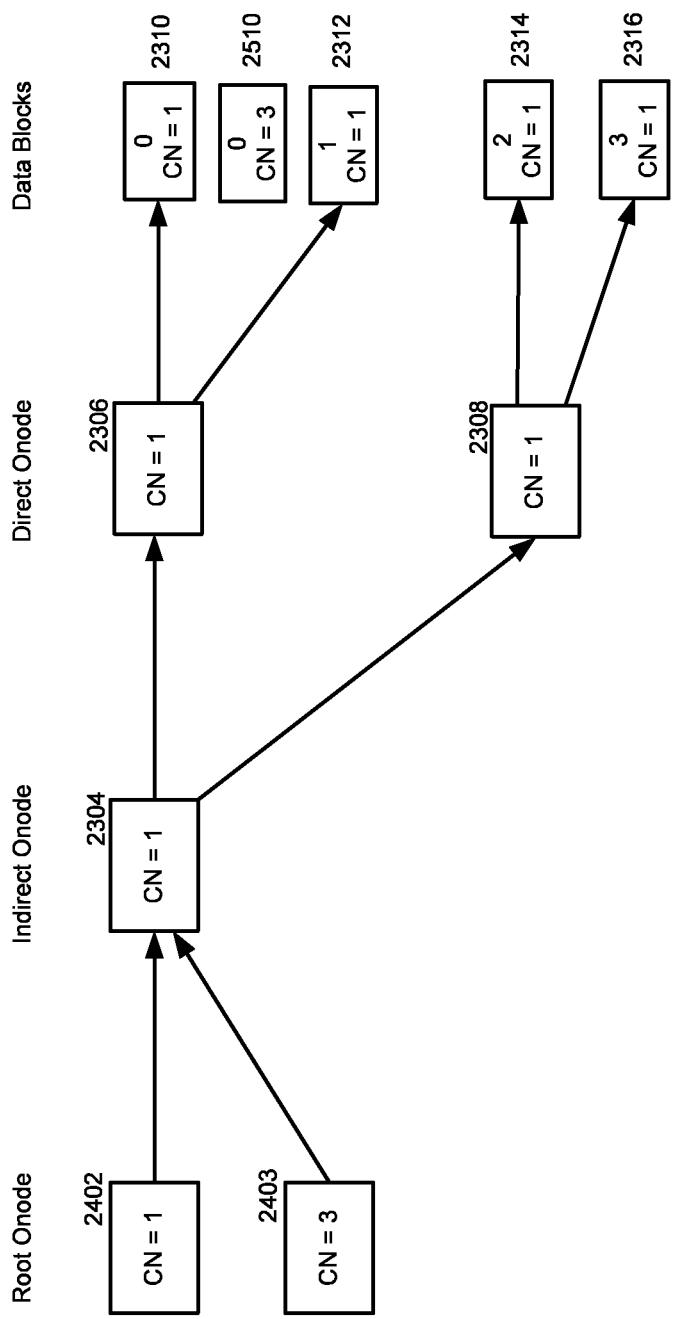
FIG. 13 is a schematic diagram that shows the structure of the exemplary object of FIG. 12 after a modified copy of a data block is created in accordance with an embodiment of the present invention.

The Object Store sub-module then traverses the object structure starting at the root node until it reaches the descriptor for data block 0 (2310). Since data block 0 (2310) is part of an earlier checkpoint, it cannot be modified. Instead, the Object Store sub-module creates a modified copy of data block 2310 in free space on the disk and marks this new data block with checkpoint number 3 (i.e., the checkpoint at which it was created). FIG. 13 schematically shows the object structure after creation of the new data block 2510.

Figure 14:
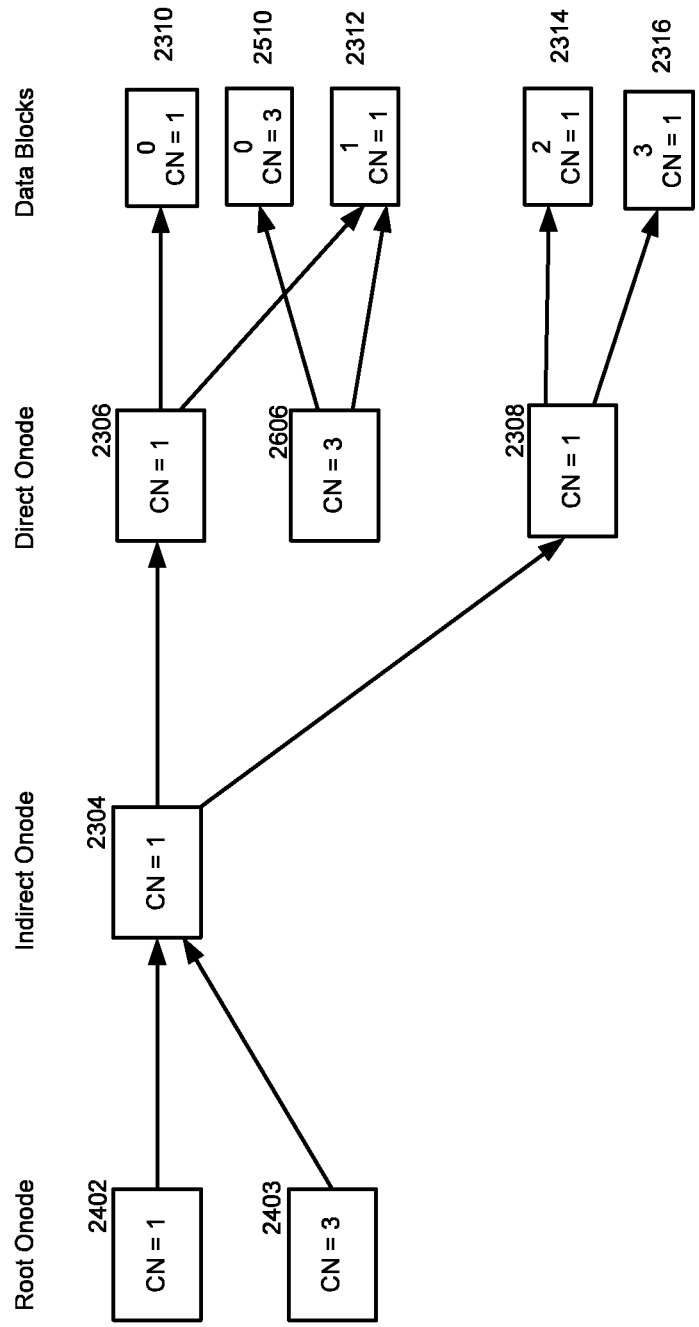
FIG. 14 is a schematic diagram that shows the structure of the exemplary object of FIG. 13 after a new direct onode is created to point to the modified copy of the data block in accordance with an embodiment of the present invention.

The Object Store sub-module now needs to put a pointer to the new data block 2510 in a direct node, but the Object Store sub-module cannot put a pointer to the new data block 2510 in the direct node 2306 because the direct node 2306 is a component of the earlier checkpoint. The Object Store sub-module therefore creates a modified copy of direct node 2306 to free space on the disk including pointers to the new data block 0 (2510) and the old data block 1 (2312) and marks this new direct node with checkpoint number 3 (i.e., the checkpoint at which it was created). FIG. 14 schematically shows the object structure after creation of the new direct node 2606 including pointers to the new data block 0 (2510) and the old data block 1 (2312).

Figure 15:
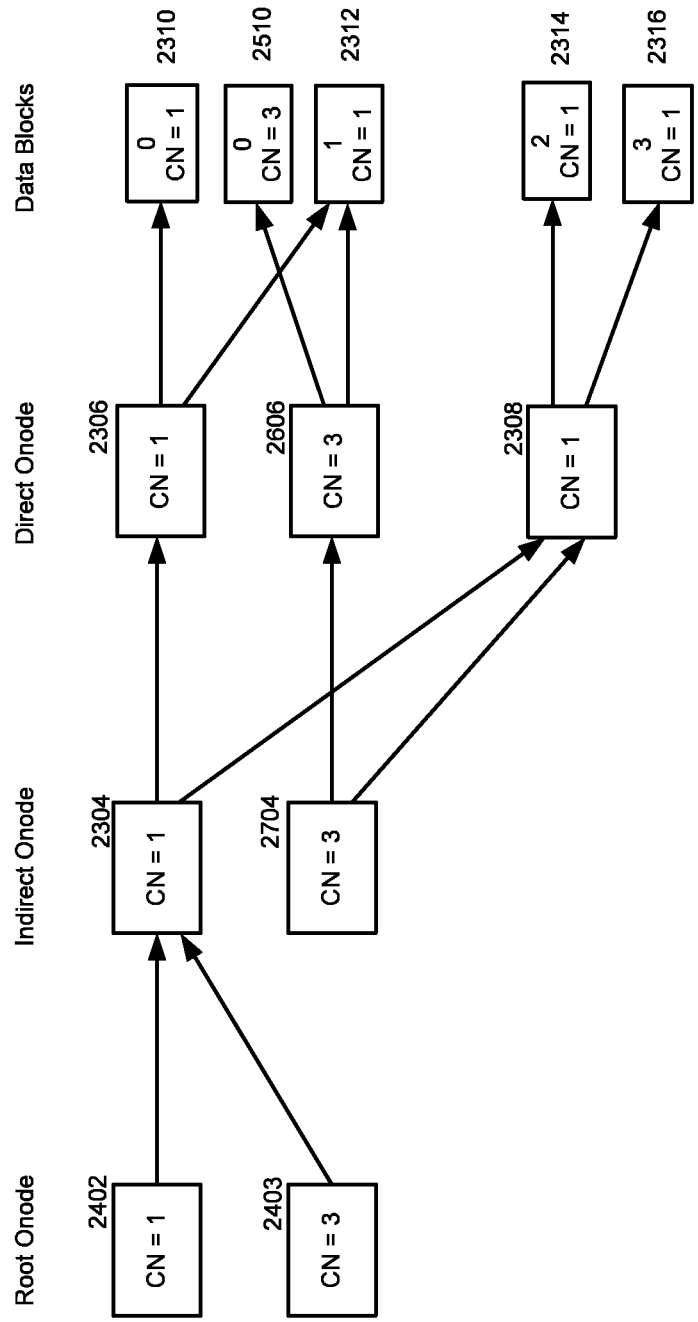
FIG. 15 is a schematic diagram that shows the structure of the exemplary object of FIG. 14 after a new indirect onode is created to point to the new direct onode in accordance with an embodiment of the present invention.

The Object Store sub-module now needs to put a pointer to the new direct node 2606 in an indirect node, but the Object Store sub-module cannot put a pointer to the new direct node 2606 in the indirect node 2304 because the indirect node 2304 is a component of the earlier checkpoint. The Object Store sub-module therefore creates a modified copy of indirect node 2304 with pointers to the new direct node 2606 and the old direct node 2308. FIG. 15 schematically shows the object structure after creation of the new indirect node including pointers to the new direct node 2606 and the old direct node 2308.

Figure 16:
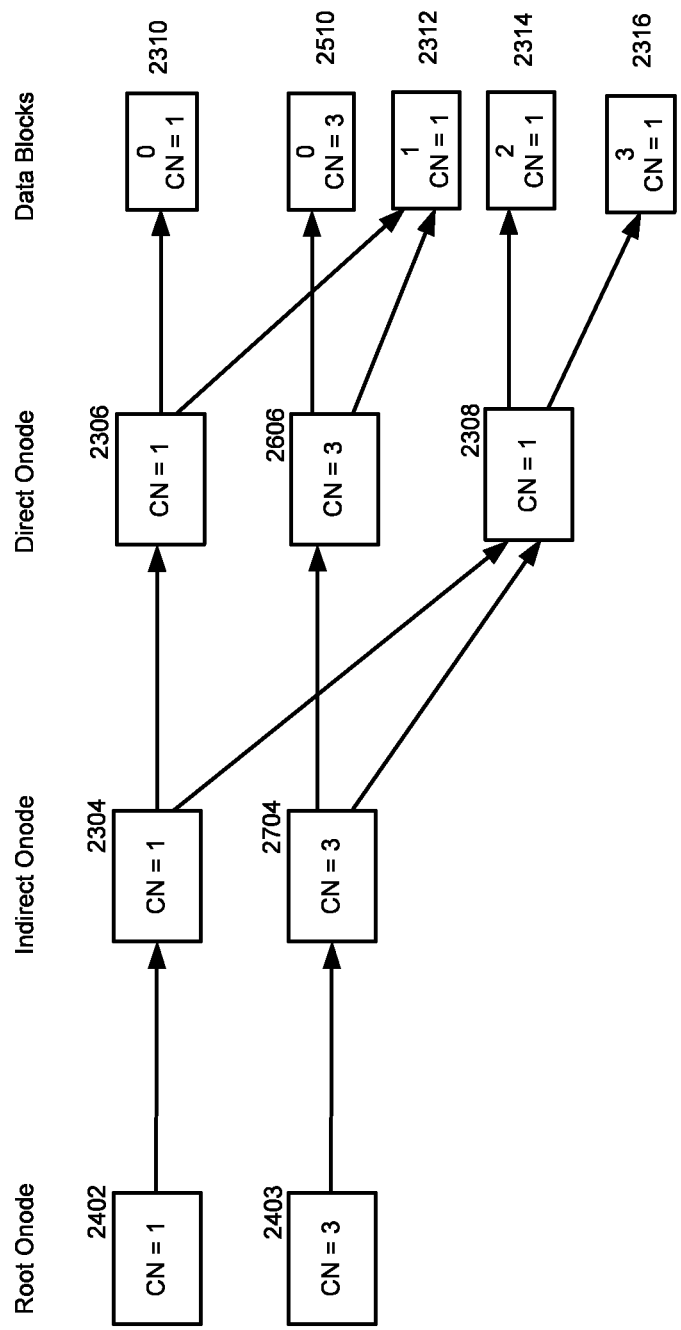
FIG. 16 is a schematic diagram that shows the structure of the exemplary object of FIG. 15 after the new root node is updated to point to the new indirect onode in accordance with an embodiment of the present invention.

Finally, the Object Store sub-module writes a pointer to the new indirect node 2704 in the new root node 2403. FIG. 16 schematically shows the object structure after the pointer to the new indirect node 2704 is written into the new root node 2403.

It should be noted that, after modification of data block 0 is complete, blocks 2402, 2304, 2306, and 2310 are components of the checkpoint 1 version but are not components of the current checkpoint 3 version of the object; blocks 2308, 2312, 2314, and 2316 are components of both the checkpoint 1 version and the current checkpoint 3 version of the object; and blocks 2403, 2704, 2606, and 2510 are components of the current checkpoint 3 version of the object but are not components of the checkpoint 1 version.

It should also be noted that the new node do not necessarily need to be created in the order described above. For example, the new root node could be created last rather than first.

Thus, when a filesystem object is modified, the changes propagate up through the object tree structure so that a new root node is created for the modified object. A new root node would only need to be created for an object once in a given checkpoint; the new root node can be revised multiple times during a single checkpoint.

In order for the new version of the object to be included in the current version of the filesystem, the current indirection object is modified to point to the root node of the modified object rather than to the root node of the previous version of the object. For example, with reference again to FIG. 16, the current indirection object would be updated to point to root node 2403 rather than to root node 2402 for the object number associated with this object.

Similarly, if a new object is created or an existing object is deleted in the current version of the filesystem, the current indirection object is updated accordingly. For example, if a new object is created, the indirection object is modified to include a pointer to the root node of the new object. If an existing object is deleted, the indirection object is modified to mark the corresponding object number as free.

Since the indirection object is also a tree structure having a root node, modification of the indirection object also propagates up through the tree structure so that a new root node would be created for the modified indirection object. Again, a new root node would only need to be created for the indirection object once in a given checkpoint; the new root node can be revised multiple times during a single checkpoint.

Thus, when a new version of the indirection object is created during a particular checkpoint, the DSB associated with that checkpoint is updated to point to the new root node for the modified indirection object. Therefore, each version of the filesystem (i.e., the current version and each checkpoint version) generally will include a separate version of the indirection object, each having a different indirection object root node (but possibly sharing one or more indirect nodes, direct nodes, and/or data blocks).

In one exemplary embodiment, the DSBs are treated as a circular list, and checkpoints continue to be taken at scheduled intervals such that, during the steady state, each new checkpoint "overwrites" an old checkpoint so that the old version of the filesystem represented by the "overwritten" checkpoint is lost.

Figure 17:
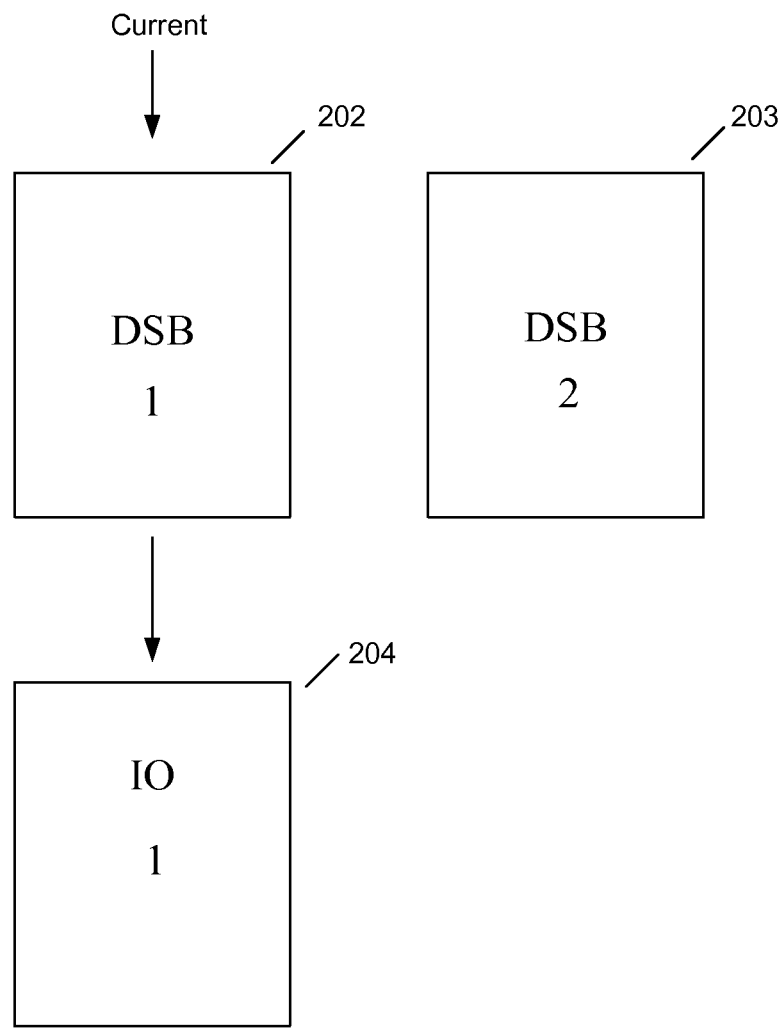
FIG. 17 is a schematic diagram showing various filesystem structures prior to the taking of a checkpoint, in accordance with an exemplary embodiment of the present invention using a circular list of DSBs to record checkpoints.

FIG. 17 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

Figure 18:
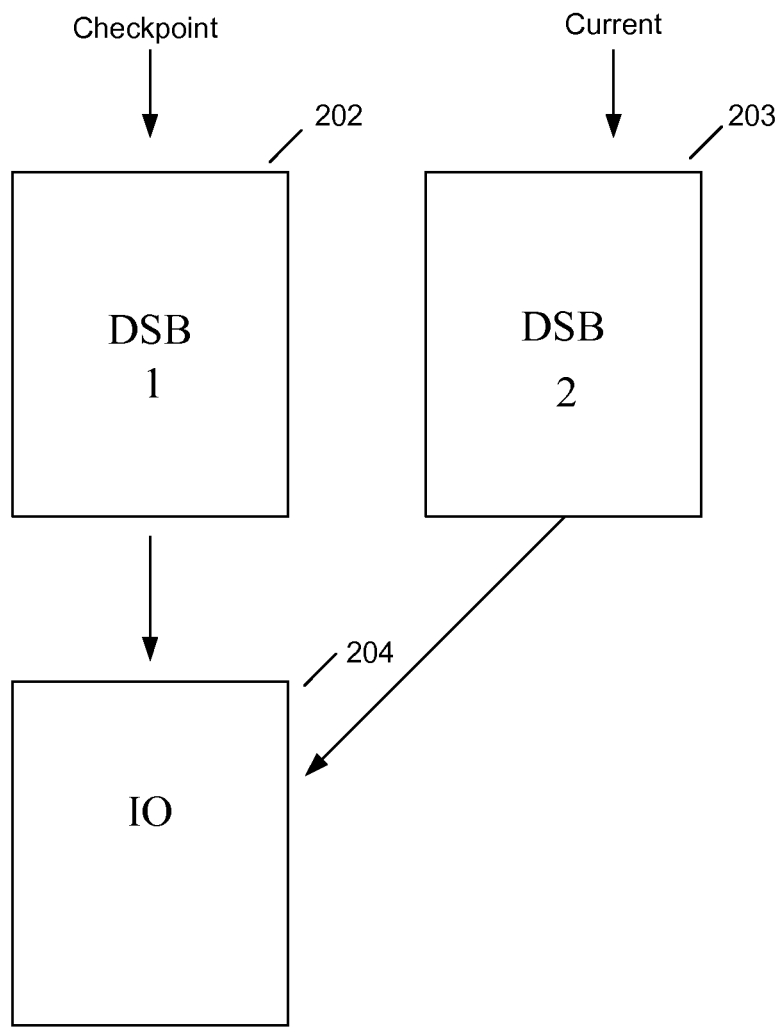
FIG. 18 is a schematic diagram showing the various filesystem structures of FIG. 17 after a checkpoint is taken, in accordance with an exemplary embodiment of the present invention using a circular list of DSBs to record checkpoints.

In order to create a checkpoint from the current version of the filesystem, the next DSB in the circular list (i.e., DSB 203 in this example) is initialized for the new checkpoint. Among other things, such initialization includes writing the next checkpoint number into DSB 203 and storing a pointer to the root node of indirection object 204 into DSB 203. FIG. 18 is a schematic diagram showing the various filesystem structures after a checkpoint is taken, in accordance with an exemplary embodiment of the present invention. At this point, DSB 202 represents the most recent checkpoint version of the filesystem, while DSB 203 represents the current (working) version of the filesystem.

Figure 19:
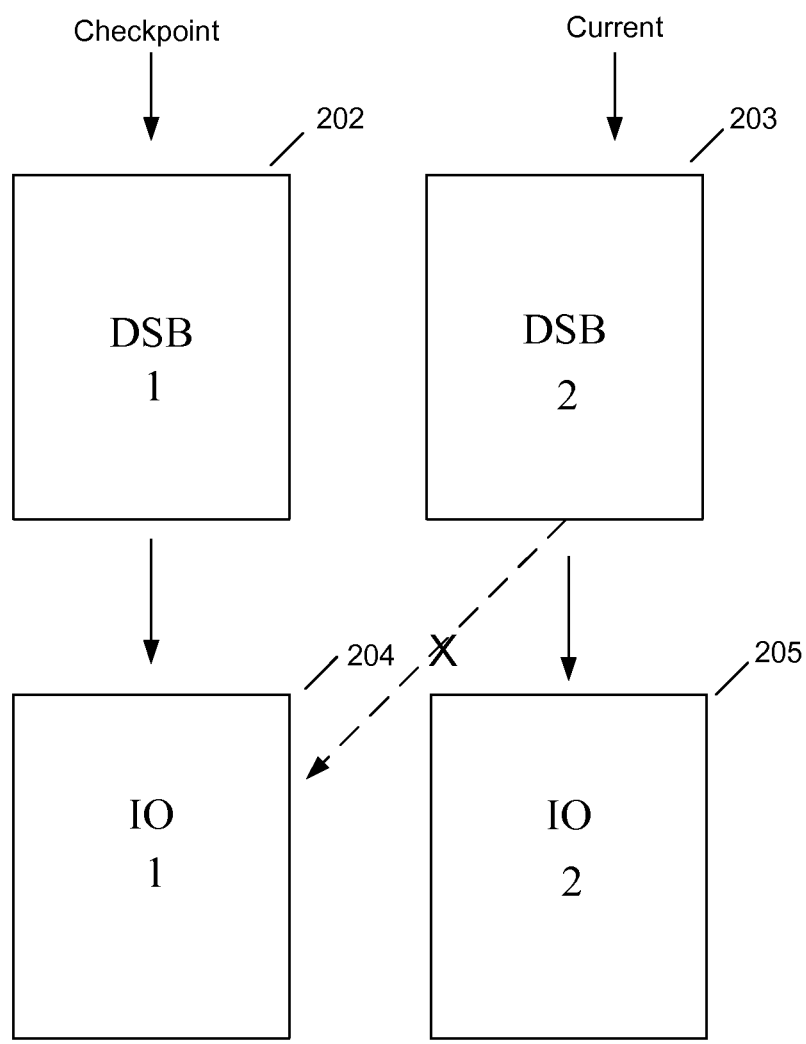
FIG. 19 is a schematic diagram showing the various filesystem structures of FIG. 18 after modification of the indirection object, in accordance with an exemplary embodiment of the present invention using a circular list of DSBs to record checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 18, such that a new indirection object root node is created, the DSB for the current filesystem version (i.e., DSB 203 in FIG. 18) is updated to point to the new indirection object root node rather than to the prior indirection object root node. FIG. 19 is a schematic diagram showing the various filesystem structures after modification of the indirection object, in accordance with an exemplary embodiment of the present invention. Here, DSB 202, which is associated with the checkpoint version of the filesystem, points to the checkpoint version of the indirection object 204, while DSB 203, which is associated with the current version of the filesystem, points to the root node of new indirection object 205.

As discussed above, checkpoints generally are taken at regular intervals such that multiple versions of the filesystem are maintained over time. At each checkpoint, the current (working) version of the filesystem moves to the next successive DSB in the circular list. When a particular checkpoint version is deleted from the system (e.g., because its DSB has been re-used), storage associated with the deleted checkpoint can be recovered in due course, for example, using a background task that identifies and frees storage that is no longer being used.

In one alternative embodiment, a particular DSB may be reused as the current DSB for successive checkpoints, with the other DSBs used to save checkpoint versions of the file system.

Figure 20:
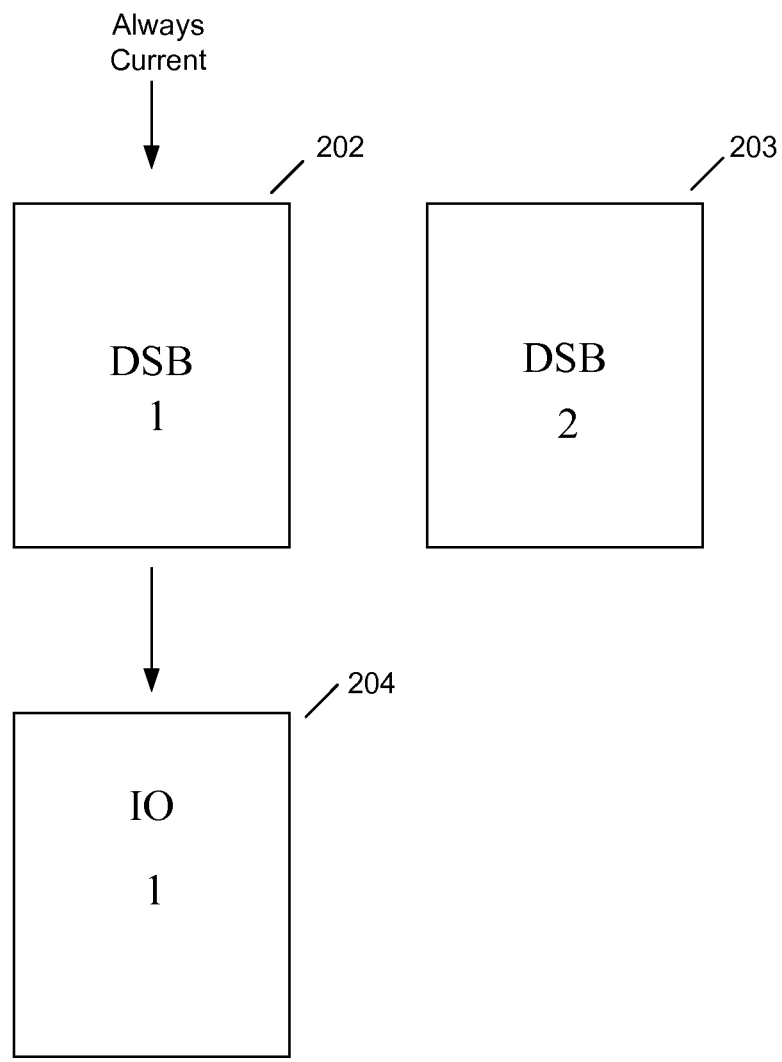
FIG. 20 is a schematic diagram showing various filesystem structures prior to the taking of a checkpoint, in accordance with an exemplary embodiment of the present invention in which one DSB is reused to create successive checkpoints.

FIG. 20 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

In order to create a checkpoint from the current version of the filesystem, the next DSB 203 is initialized for the new checkpoint. Among other things, such initialization includes writing the next checkpoint number into DSB 203 and storing a pointer to the root node of indirection object 204 into DSB 203. FIG. 18 is a schematic diagram showing the various filesystem structures after a checkpoint is taken, in accordance with an exemplary embodiment of the present invention. At this point, DSB 203 represents the most recent checkpoint version of the filesystem, while DSB 202 continues to represent the current (working) version of the filesystem.

Figure 21:
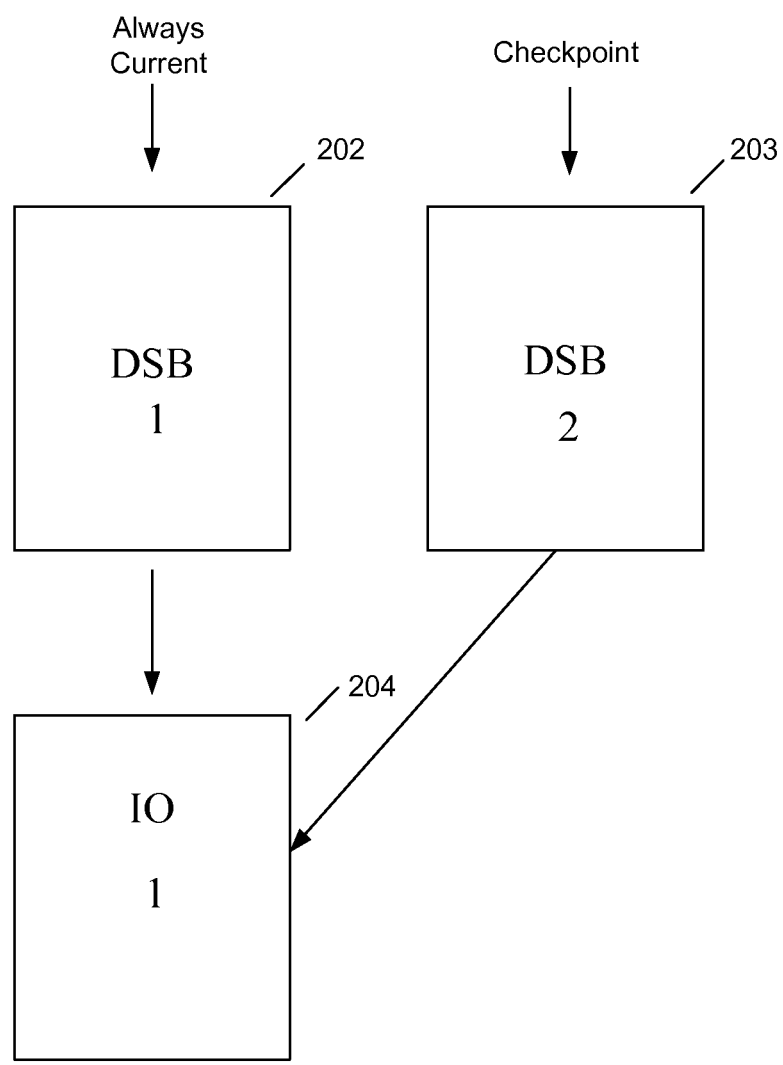
FIG. 21 is a schematic diagram showing the various filesystem structures of FIG. 20 after a checkpoint is taken, in accordance with an exemplary embodiment of the present invention in which one DSB is reused to create successive checkpoints.
Figure 22:
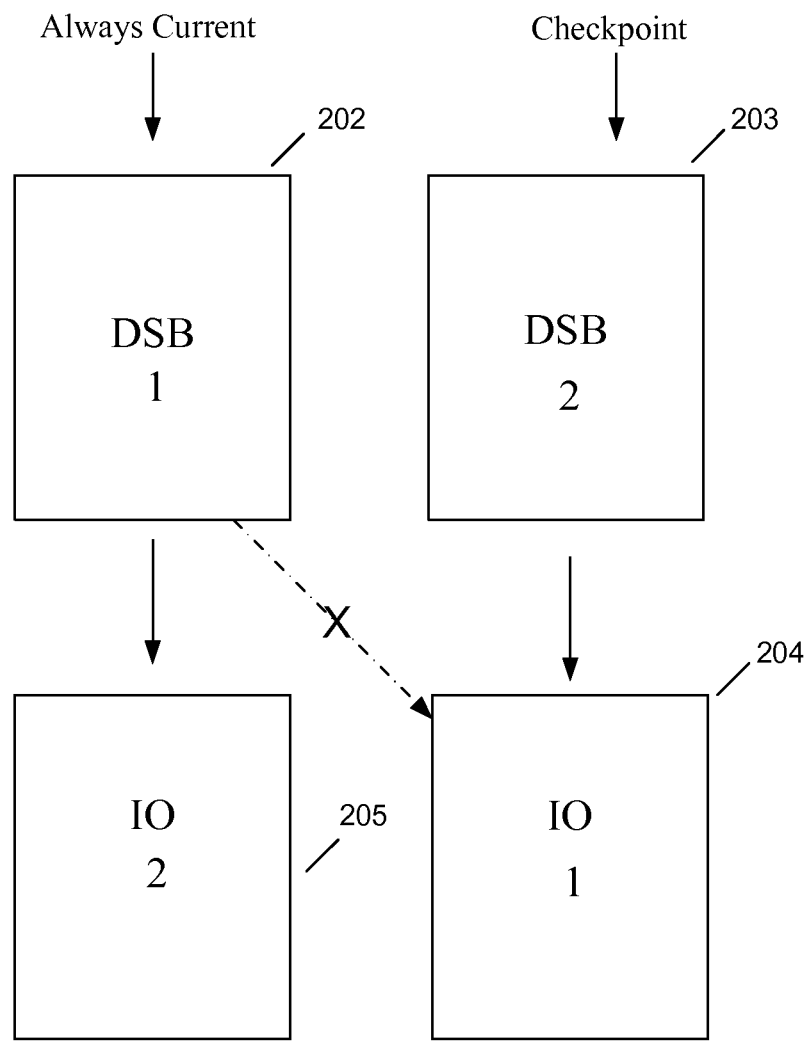
FIG. 22 is a schematic diagram showing the various filesystem structures of FIG. 21 after modification of the indirection object, in accordance with an exemplary embodiment of the present invention in which one DSB is reused to create successive checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 21, such that a new indirection object root node is created, the DSB for the current filesystem version (i.e., DSB 202 in FIG. 21) is updated to point to the new indirection object root node rather than to the prior indirection object root node. FIG. 22 is a schematic diagram showing the various filesystem structures after modification of the indirection object, in accordance with an exemplary embodiment of the present invention. Here, DSB 203, which is associated with the checkpoint version of the filesystem, points to the checkpoint version of the indirection object 204, while DSB 202, which continues to be associated with the current version of the filesystem, points to the root node of new indirection object 205.

When a volume is mounted, the system will normally want to go back to the last valid checkpoint. There may be times, however, when the system or user may choose to revert to an earlier valid checkpoint. In embodiments of the present invention, the file server 9002 is capable of maintaining more that one checkpoint, so there may be multiple versions of the filesystem to which the filesystem can be reverted. Utilities can be provided to allow an operator to examine the contents of the various checkpoint versions in order to facilitate selection of a checkpoint version for reverting the filesystem.

Even though N checkpoints may be maintained in the system (where N is typically greater than two and may be user-configurable), a user-triggered mechanism may be provided for retaining a checkpoint such that it will remain valid and accessible (read-only) until the user chooses to delete it. A retained checkpoint is essentially a read-only version of the file system structure at a particular checkpoint. Multiple retained checkpoints can be taken, and mechanisms are included for deleting a selected retained checkpoint or reverting the file system to a selected retained checkpoint (for example, to return the file system to a known state following a catastrophe). As long as a retained checkpoint remains active, the nodes and data blocks that comprise the retained checkpoint cannot be modified or returned to free space. It should be noted that a node or data block can be a component of multiple retained checkpoints, and a particular node or data block cannot be returned to free space as long as the node or data block is a component of at least one retained checkpoint.

In an exemplary embodiment, taking a retained checkpoint involves, among other things, saving a copy of the corresponding DSB in free space on disk and storing a reference to the stored DSB copy in the retained checkpoint configuration object. As long as a retained checkpoint is stored in the filesystem, structures associated with the retained checkpoint cannot be deleted. This is true even if the checkpoint from which the retained checkpoint was taken has been overwritten. In an exemplary embodiment, the file server 9002 includes mechanisms to prevent structures associated with retained checkpoints from being deleted.

It should be noted that the term "server" is used herein to describe a device that may be used in a communication system and should not be construed to limit the present invention to any particular type of device. Thus, embodiments of the present invention may be implemented in a client, server, computer, switch, or other type of communication device.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in an appropriate programming language (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for managing a file system, the method comprising:
   managing a plurality of superblocks, each superblock being a root of a respective file system tree structure and representing a version of the file system including a current version of the file system represented by a first superblock of the plurality of superblocks and a checkpoint version of the file system represented by a second superblock of the plurality of superblocks;
   managing a plurality of indirection objects, wherein a first indirection object comprises a first object tree structure including a first object root node of the first indirection object and one or more direct nodes of the first indirection object being directly or indirectly referenced by the first object root node of the first indirection object, and wherein a second indirection object comprises a second object tree structure including a second object root node of the second indirection object and one or more direct nodes of the second indirection object being directly or indirectly referenced by the second object root node of the second indirection object;
   referencing, by each of the plurality of superblocks, the object root node of at least one of the indirection objects such that the respective object root node of each of the indirection objects is referenced by at least one of the plurality of superblocks;
   providing access to the current version of the file system, by using the first indirection object referenced by the first superblock; and
   providing access to the checkpoint version of the file system, by using the second indirection object referenced by the second superblock,
   wherein the second object tree structure of the second indirection object has a first direct node that points to a first data block and the first object tree structure of the first indirection object also has the first direct node that points to the first data block and a second direct node that points to a new data block, and
   wherein the second object tree structure does not have the second direct node that points to the new data block.

2. A method according to claim 1, wherein managing the plurality of superblocks comprises:
   maintaining the plurality of superblocks at fixed locations within the file system.

3. A method according to claim 1, wherein the plurality of superblocks comprises at least three superblocks.

4. A method according to claim 1, wherein the superblocks are logically arranged as a circular list.

5. A method according to claim 1, wherein maintaining the current version of the filesystem using the first indirection object referenced by the first superblock comprises:
   initially including in the second superblock a reference to the first indirection object referenced by the first superblock; and
   upon modification of the first indirection object referenced by the first superblock:
   creating a new version of the first indirection object; and
   including in the second superblock a reference to the new version.

6. A method according to claim 1, wherein maintaining the current version of the filesystem using the first indirection object referenced by the first superblock comprises:
   creating a new version of the first indirection object upon retaining a checkpoint version of the file system; and
   including in the second superblock a reference to the new version.

7. A method according to claim 1, wherein the number of superblocks is fixed.

8. A method according to claim 1, wherein the number of superblocks is user-configurable.

9. A method according to claim 1, further comprising:
   including a distinct checkpoint number in each superblock associated with a checkpoint version of the file system.

10. A method according to claim 1, wherein the indirection objects are implemented as pseudo-files that map each of a plurality of object numbers to a sector address of a root node associated with a corresponding file system object.

11. Apparatus for managing a file system, comprising:
    at least one storage device; and
    a storage processor in communication with the at least one storage device, the storage processor including circuitry configured for:
    managing a plurality of superblocks, each superblock being a root of a respective file system tree structure and representing a version of the file system including a current version of the file system represented by a first superblock of the plurality of superblocks and a checkpoint version of the file system represented by a second superblock of the plurality of superblocks;
    managing a plurality of indirection objects, wherein a first indirection object comprises a first object tree structure including a first root node of the first indirection object and one or more direct nodes of the first indirection object being directly or indirectly referenced by the object root node of the first indirection object, and wherein a second indirection object comprises a second object tree structure including a second object root node of the second indirection object and one or more direct nodes of the second indirection object being directly or indirectly referenced by the second object root node of the second indirection object;
    referencing, by each of the plurality of superblocks, the object root node of at least one of the indirection objects such that the respective object root node of each of the indirection objects is referenced by at least one of the plurality of superblocks;
    providing access to the current version of the file system, by using the first indirection object referenced by the first superblock; and providing access to the checkpoint version of the file system, by using the second indirection object referenced by the second superblock, wherein the second object tree structure of the second indirection object has a first direct node that points to a first data block and the first object tree structure of the first indirection object also has the first direct node that points to the first data block and a second direct node that points to a new data block, and wherein the second object tree structure does not have the second direct node that points to the new data block.

12. Apparatus according to claim 11, wherein the storage processor circuitry is configured for maintaining the plurality of superblocks at fixed locations within the file system.

13. Apparatus according to claim 11, wherein the plurality of superblocks comprises at least three superblocks.

14. Apparatus according to claim 11, wherein the superblocks are logically arranged as a circular list.

15. Apparatus according to claim 11, wherein the storage processor circuitry comprises at least one of:
a processor and a tangible, non-transitory computer readable medium in communication with the processor, the computer readable medium storing computer program logic that, when run on the processor, causes the processor to perform at least one storage processor operation;
a programmable logic device and a tangible, non-transitory computer readable medium in communication with the programmable logic device, the computer readable medium storing programmable logic that, when used with the programmable logic device, causes the programmable logic device to perform at least one storage processor operation;
discrete hardware components configured to perform at least one storage processor operation; or
integrated circuitry configured to perform at least one storage processor operation.

16. Apparatus according to claim 11, wherein the storage processor circuitry is configured for initially including in the second superblock a reference to the first indirection object referenced by said first superblock; and upon modification of the first indirection object referenced by said first superblock, creating a new version of the first indirection object and including in the second superblock a reference to the new version.

17. Apparatus according to claim 11, wherein the storage processor circuitry is configured for creating a new version of said indirection object upon retaining a checkpoint version of the file system and including in said at least one second superblock a reference to said new version.

18. Apparatus according to claim 11, wherein the number of superblocks is fixed.

19. Apparatus according to claim 11, wherein the number of superblocks is user-configurable.

20. Apparatus according to claim 11, wherein the storage processor circuitry is further configured for including a distinct checkpoint number in each superblock associated with a checkpoint version of the file system.

21. Apparatus according to claim 11, wherein the indirection objects are implemented as pseudo-files that map each of a plurality of object numbers to a sector address of a root node associated with a corresponding file system object.

22. A computer program product comprising a tangible, non-transitory computer-readable medium having embodied therein a computer program for managing a file system, the computer program including instructions that, when run on a computer processor of the file system, causes the computer processor to perform processes comprising:
managing a plurality of superblocks, each superblock being a root of a respective file system tree structure and representing a version of the file system including a current version of the file system represented by a first superblock of the plurality of superblocks and at least one checkpoint version of the file system represented by at least one second superblock of the plurality of superblocks;
managing a plurality of indirection objects, wherein a first indirection object comprises a first object tree structure including a first object root node of the first indirection object and one or more direct nodes of the first indirection object being directly or indirectly referenced by the first object root node of the first indirection object, and wherein a second indirection object comprises a second object tree structure including a second object root node of the second indirection object and one or more direct nodes of the second indirection object being directly or indirectly referenced by the second object root node of the second indirection object;
referencing, by each of the plurality of superblocks the object root node of at least one of the indirection objects such that the respective object root node of each of the indirection objects is referenced by at least one of the plurality of superblocks;
providing access to the current version of the file system, by using the first indirection object referenced by the first superblock; and
providing access to the checkpoint version of the file system, by using the second superblock;
wherein the second object tree structure of the second indirection object has a first direct node that points to a first data block and the first object tree structure of the first indirection object also has the first direct node that points to the first data block and a second direct node that points to a new data block, and
wherein the second object tree structure does not have the second direct node that points to the new data block.

23. A computer program product according to claim 22, wherein managing the plurality of superblocks comprises:
maintaining the plurality superblocks at fixed locations within the file system.

24. A computer program product according to claim 22, wherein the superblocks are logically arranged as a circular list.

25. A computer program product according to claim 22, wherein maintaining the current version of the filesystem using the first indirection object referenced by the first superblock comprises:
initially including in the second superblock a reference to the first indirection object referenced by the first superblock; and
upon modification of the first indirection object referenced by said first superblock:
creating a new version of the first indirection object; and
including in the second superblock a reference to the new version.

26. A computer program product according to claim 22, wherein maintaining the current version of the filesystem using the first indirection object referenced by the first superblock comprises:
creating a new version of the first indirection object upon retaining a checkpoint version of the file system; and
including in the second superblock a reference to the new version.

27. A computer program product according to claim 22, wherein the number of superblocks is fixed.

28. A computer program product according to claim 22, wherein the number of superblocks is user-configurable.

29. A computer program product according to claim 22, further comprising:
   including a distinct checkpoint number in each superblock associated with a checkpoint version of the file system.

30. A computer program product according to claim 22, wherein the indirection objects are implemented as pseudo-files that map each of a plurality of object numbers to a sector address of a root node associated with a corresponding file system object.

31. A computer program product according to claim 22, wherein the plurality of superblocks comprises at least three superblocks.

\* \* \* \* \*